United States Patent
Okamoto et al.

(10) Patent No.: US 10,225,569 B2
(45) Date of Patent: Mar. 5, 2019

(54) DATA STORAGE CONTROL APPARATUS AND DATA STORAGE CONTROL METHOD

(71) Applicant: MegaChips Corporation, Osaka-shi (JP)

(72) Inventors: Akira Okamoto, Osaka (JP); Tomoaki Madanbashi, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 330 days.

(21) Appl. No.: 14/659,828

(22) Filed: Mar. 17, 2015

(65) Prior Publication Data

US 2015/0277776 A1 Oct. 1, 2015

(30) Foreign Application Priority Data

Mar. 31, 2014 (JP) .................................. 2014-071105
Mar. 31, 2014 (JP) .................................. 2014-071106

(51) Int. Cl.
*G06F 3/06* (2006.01)
*H04N 19/426* (2014.01)
(Continued)

(52) U.S. Cl.
CPC ........... *H04N 19/426* (2014.11); *H04N 19/12* (2014.11); *H04N 19/132* (2014.11); *H04N 19/15* (2014.11);
(Continued)

(58) Field of Classification Search
CPC .... H04N 19/426; H04N 19/15; H04N 19/593; H04N 19/12; H04N 19/80; H04N 19/154;
(Continued)

(56) References Cited

U.S. PATENT DOCUMENTS 7,979,622 B2   7/2011   Okamoto
8,194,736 B2   6/2012   Youn
(Continued)

FOREIGN PATENT DOCUMENTS

JP   11-055676 A   2/1999
JP   2002-209111 A   7/2002
(Continued)

OTHER PUBLICATIONS

Office Action dated Dec. 19, 2017 in Japanese Application No. 2014-071105 with English Translation.
(Continued)

*Primary Examiner* — Zhihan Zhou
(74) *Attorney, Agent, or Firm* — Xsensus LLP

(57) ABSTRACT

A compressed data generator compresses, by using a lossless compressor and a lossy compressor, image data in units of first blocks to generate a plurality of types of compressed data. A selector performs selection processing in units of second blocks each including a predetermined number N of first blocks, where N is an integer of 1 or more. The selection processing involves determining whether each of the plurality of types of compressed data satisfies a selection condition and selecting one piece of compressed data that satisfies the selection condition. The selection condition includes a data size condition that a data size of all the first blocks included in the second block is less than or equal to a predetermined value, and a data accuracy condition that information maintaining accuracy is highest among compressed data that satisfy the data size condition.

18 Claims, 23 Drawing Sheets

(51) Int. Cl.
*H04N 19/15* (2014.01)
*H04N 19/593* (2014.01)
*H04N 19/12* (2014.01)
*H04N 19/132* (2014.01)
*H04N 19/154* (2014.01)
*H04N 19/182* (2014.01)
*H04N 19/184* (2014.01)
*H04N 19/80* (2014.01)

(52) U.S. Cl.
CPC ......... *H04N 19/154* (2014.11); *H04N 19/182* (2014.11); *H04N 19/184* (2014.11); *H04N 19/593* (2014.11); *H04N 19/80* (2014.11)

(58) Field of Classification Search
CPC ... H04N 19/182; H04N 19/184; H04N 19/132
USPC ...................................... 375/240.01; 382/244
See application file for complete search history.

(56) References Cited

U.S. PATENT DOCUMENTS

| | | | | |
|---|---|---|---|---|
| 2003/0202607 | A1* | 10/2003 | Srinivasan | H04N 19/61 375/240.29 |
| 2003/0228063 | A1* | 12/2003 | Nakayama | H04N 1/41 382/251 |
| 2006/0233446 | A1 | 10/2006 | Saito et al. | |
| 2007/0253629 | A1* | 11/2007 | Oshio | H04N 19/119 382/240 |
| 2008/0212130 | A1* | 9/2008 | Jung | H03M 7/30 358/1.15 |
| 2009/0257485 | A1* | 10/2009 | Youn | H04N 19/176 375/240.01 |
| 2010/0135415 | A1* | 6/2010 | Song | H04N 19/176 375/240.24 |
| 2012/0020581 | A1* | 1/2012 | Zarom | H04N 19/46 382/233 |
| 2012/0314480 | A1 | 12/2012 | Onishi et al. | |
| 2013/0050254 | A1* | 2/2013 | Tran | G06F 3/14 345/629 |
| 2013/0101036 | A1* | 4/2013 | Zhou | H04N 19/00569 375/240.12 |
| 2014/0044371 | A1 | 2/2014 | Madanbashi et al. | |
| 2014/0348437 | A1 | 11/2014 | Okamoto | |

FOREIGN PATENT DOCUMENTS

| | | |
|---|---|---|
| JP | 2003-051952 A | 2/2003 |
| JP | 2005-151312 A | 6/2005 |
| JP | 2006-303690 A | 11/2006 |
| JP | 2008-004984 A | 1/2008 |
| JP | 2009-260977 | 11/2009 |
| JP | 2011-120080 A | 6/2011 |
| JP | 2012-256392 A | 12/2012 |
| JP | 5147102 | 2/2013 |
| JP | 2013-135254 | 7/2013 |
| JP | 2014-036296 A | 2/2014 |

OTHER PUBLICATIONS

Office Action dated Nov. 21, 2017 in Japanese Application No. 2014-071106 with English Translation.

* cited by examiner

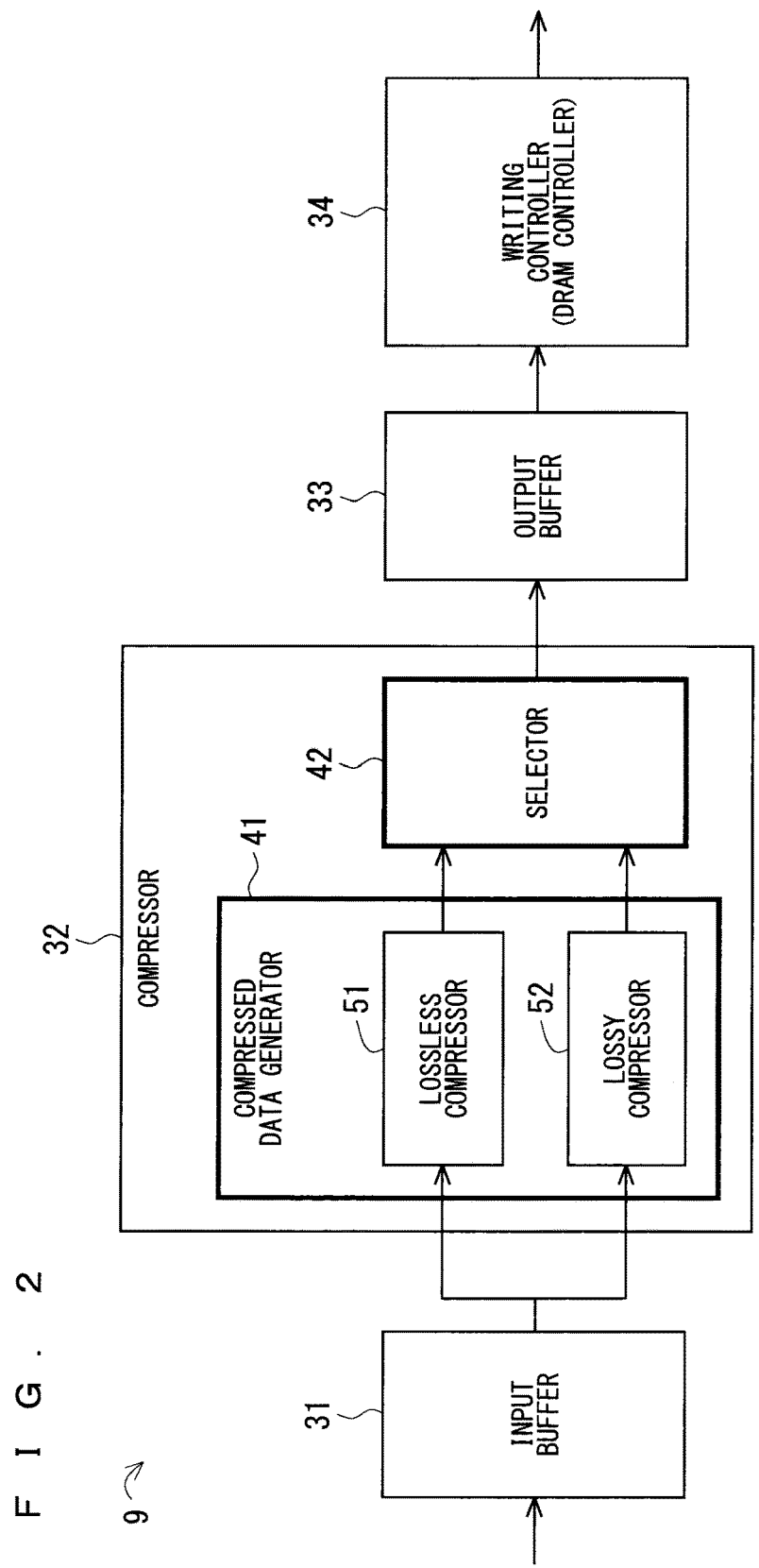

F I G . 3
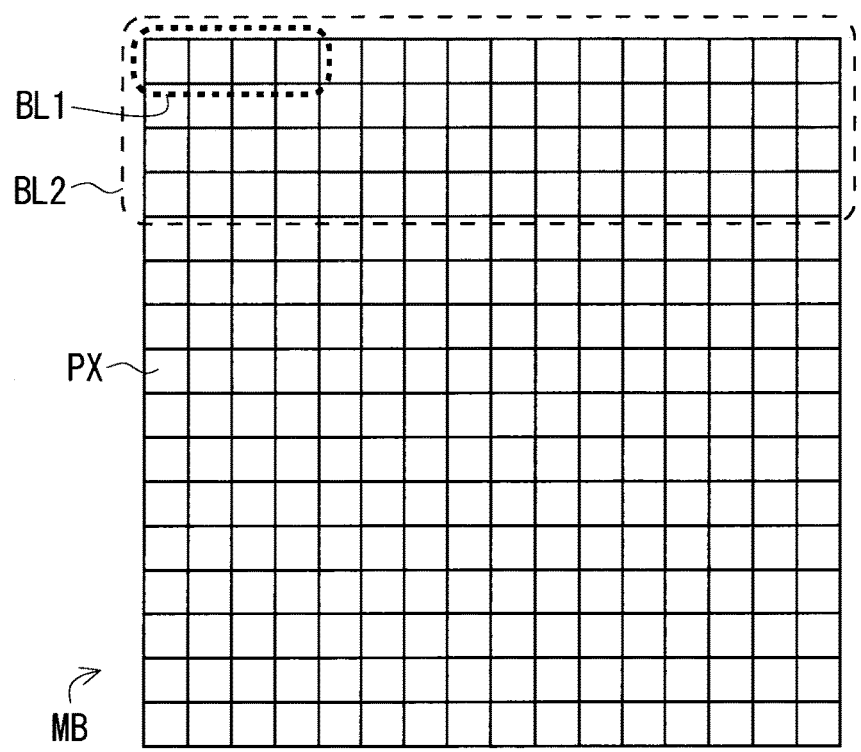
F I G . 4
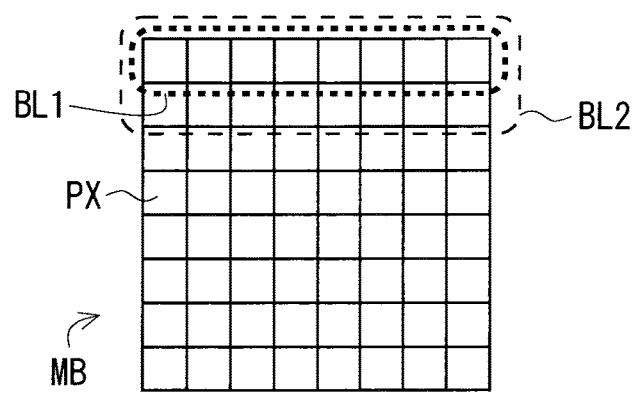

62a

PIXEL OF INTEREST

PIXEL VALUE   P0  P1  P2  P3  P4  P5  P6  P7  P8
LPF COEFFICIENTS  C0  C1  C2  C3  C4  C5  C6  C7  C8

PIXEL VALUE OF PIXEL OF INTEREST AFTER LPF $= \left( \sum_{n=0}^{8} P_n \times C_n \right) \div 256$ $= (P0 \times C0 + P1 \times C1 + P2 \times C2 + P3 \times C3$
$\quad + P4 \times C4$
$\quad\quad + P5 \times C5 + P6 \times C6 + P7 \times C7 + P8 \times C8) / 256$ WHERE $\sum_{n=0}^{8} C_n = 256$ 62b Dg < Dd < Df < Dc < De < Db < Da

LOW  INFORMATION MAINTAINING ACCURACY  HIGH

FIG. 17

Y COMPONENT

| BL1 | | | | | | | | | | | | | | | BL2 | | |
|---|---|---|---|---|---|---|---|---|---|---|---|---|---|---|---|---|---|
| 128 | 130 | 131 | 135 | 138 | 140 | 135 | 137 | 130 | 130 | 132 | 137 | 140 | 138 | 136 | 139 |
| 135 | 140 | 137 | 142 | 143 | 144 | 140 | 140 | 132 | 130 | 132 | 137 | 140 | 138 | 136 | 139 |
| 130 | 135 | 136 | 137 | 140 | 138 | 136 | 139 | 130 | 130 | 132 | 137 | 140 | 138 | 136 | 139 |
| 132 | 130 | 132 | 137 | 140 | 138 | 136 | 139 | 132 | 130 | 132 | 137 | 140 | 138 | 136 | 139 |

⇩ LOSSLESS COMPRESSION

Da

| BL1 | | | | | | | | | | | | | | BL2 | | |
|---|---|---|---|---|---|---|---|---|---|---|---|---|---|---|---|
| 128 | 2 | 1 | 4 | 138 | 2 | −5 | 2 | 130 | 0 | 2 | 5 | 140 | −2 | −2 | 3 |
| 135 | 5 | −3 | 5 | 143 | 1 | −4 | 0 | 132 | −2 | 2 | 5 | 140 | −2 | −2 | 3 |
| 130 | 5 | 1 | 1 | 140 | −2 | −2 | 3 | 130 | 0 | 2 | 5 | 140 | −2 | −2 | 3 |
| 132 | −2 | 2 | 5 | 140 | −2 | −2 | 3 | 132 | −2 | 2 | 5 | 140 | −2 | −2 | 3 |

FIG. 18

Cb COMPONENT ⟵ BL2

| 128 | 130 | 131 | 133 | 130 | 131 | 132 | 133 | ⟵ BL1 |
|---|---|---|---|---|---|---|---|---|
| 131 | 134 | 134 | 134 | 132 | 130 | 132 | 134 | ⟵ BL1 |

⇩ LOSSLESS COMPRESSION

Da ⟵ BL2

| 128 | 2 | 1 | 2 | −3 | 1 | 1 | 1 | ⟵ BL1 |
|---|---|---|---|---|---|---|---|---|
| 131 | 3 | 0 | 0 | −2 | −2 | 2 | 2 | ⟵ BL1 |

FIG. 19

Cr COMPONENT ⟵ BL2

| 128 | 130 | 131 | 133 | 130 | 131 | 132 | 133 | ⟵ BL1 |
|---|---|---|---|---|---|---|---|---|
| 131 | 134 | 134 | 134 | 132 | 130 | 132 | 134 | ⟵ BL1 |

⇩ LOSSLESS COMPRESSION

Da ⟵ BL2

| 128 | 2 | 1 | 2 | −3 | 1 | 1 | 1 | ⟵ BL1 |
|---|---|---|---|---|---|---|---|---|
| 131 | 3 | 0 | 0 | −2 | −2 | 2 | 2 | ⟵ BL1 |

F I G . 2 0

|  | BL1 |  |  |  |  |  |  |  |  |  | BL2 |  |  |
|---|---|---|---|---|---|---|---|---|---|---|---|---|---|---|
| 89 | 91 | 85 | 87 | 75 | 73 | 100 | 100 | 135 | 135 | 129 | 106 | 110 | 112 | 122 | 94 |
| 86 | 86 | 84 | 76 | 66 | 96 | 140 | 145 | 140 | 143 | 146 | 127 | 104 | 95 | 113 | 100 |
| 87 | 83 | 111 | 121 | 120 | 135 | 110 | 110 | 111 | 98 | 100 | 106 | 90 | 83 | 112 | 104 |
| 91 | 89 | 108 | 108 | 103 | 95 | 79 | 93 | 115 | 117 | 116 | 98 | 79 | 94 | 113 | 100 |

⇩ LOSSLESS COMPRESSION

Da

|  | BL1 |  |  |  |  |  |  |  |  |  | BL2 |  |  |
|---|---|---|---|---|---|---|---|---|---|---|---|---|---|---|
| 89 | 2 | -6 | 2 | 75 | -2 | (27) | 0 | 135 | 0 | -6 | (-23) | 110 | 2 | 10 | (-28) |
| 86 | 0 | -2 | -8 | 66 | (30) | (44) | 5 | 140 | 3 | 3 | (-19) | 104 | -9 | (18) | -13 |
| 87 | -4 | (28) | 10 | 120 | 15 | (-25) | 0 | 111 | -13 | 2 | 6 | 90 | -7 | (29) | -8 |
| 91 | -2 | (19) | 0 | 103 | -8 | -16 | 14 | 115 | 2 | -1 | (-18) | 79 | 15 | (19) | -13 |

F I G . 2 1

|  | BL1 |  |  |  |  |  |  |  |  |  | BL2 |  |  |
|---|---|---|---|---|---|---|---|---|---|---|---|---|---|---|
| 89 | 91 | 85 | 87 | 75 | 73 | 100 | 100 | 135 | 135 | 129 | 106 | 110 | 112 | 122 | 94 |
| 86 | 86 | 84 | 76 | 66 | 96 | 140 | 145 | 140 | 143 | 146 | 127 | 104 | 95 | 113 | 100 |
| 87 | 83 | 111 | 121 | 120 | 135 | 110 | 110 | 111 | 98 | 100 | 106 | 90 | 83 | 112 | 104 |
| 91 | 89 | 108 | 108 | 103 | 95 | 79 | 93 | 115 | 117 | 116 | 98 | 79 | 94 | 113 | 100 |

⇩ LPF (WEAK)

|  | BL1 |  |  |  |  |  |  |  |  |  | BL2 |  |  |
|---|---|---|---|---|---|---|---|---|---|---|---|---|---|---|
| 90 | 88 | 88 | 83 | 76 | 78 | 91 | 108 | 128 | 136 | 125 | 108 | 107 | 117 | 114 | 98 |
| 86 | 86 | 85 | 73 | 70 | 98 | 137 | 148 | 136 | 126 | 124 | 117 | 104 | 100 | 105 | 104 |
| 85 | 90 | 106 | 119 | 126 | 125 | 115 | 109 | 106 | 101 | 102 | 101 | 90 | 90 | 102 | 108 |
| 89 | 93 | 103 | 109 | 104 | 91 | 83 | 92 | 111 | 120 | 114 | 95 | 83 | 94 | 107 | 103 |

⇩ LOSSLESS COMPRESSION

Db

|  | BL1 |  |  |  |  |  |  |  |  |  | BL2 |  |  |
|---|---|---|---|---|---|---|---|---|---|---|---|---|---|---|
| 90 | -2 | 0 | -5 | 76 | 2 | 13 | (17) | 128 | 8 | -11 | (-17) | 107 | 10 | -3 | -16 |
| 86 | 0 | -1 | -12 | 70 | (28) | (39) | 11 | 136 | -10 | -2 | -7 | 104 | -4 | 5 | -1 |
| 85 | 5 | (16) | 13 | 126 | -1 | -10 | -6 | 106 | -5 | 1 | -1 | 90 | 0 | 12 | 6 |
| 89 | 4 | 10 | 6 | 104 | -13 | -8 | 9 | 111 | 9 | -6 | (-19) | 83 | 11 | 13 | -4 |

FIG. 22

| 89 | 80 | 85 | 91 | 89 | 91 | 85 | 87 | 75 | 73 | 100 | 100 | 135 | 135 | 129 | 106 | 110 | 112 | 122 | 94 | 96 | 123 | 115 | 112 |
|---|---|---|---|---|---|---|---|---|---|---|---|---|---|---|---|---|---|---|---|---|---|---|---|
| 78 | 85 | 89 | 88 | 86 | 86 | 84 | 76 | 66 | 96 | 140 | 145 | 140 | 143 | 146 | 127 | 104 | 95 | 113 | 100 | 102 | 114 | 98 | 106 |
| 123 | 112 | 86 | 89 | 87 | 83 | 111 | 121 | 120 | 135 | 110 | 110 | 111 | 98 | 100 | 106 | 90 | 83 | 112 | 104 | 106 | 113 | 86 | 92 |
| 110 | 109 | 92 | 93 | 91 | 89 | 108 | 108 | 103 | 95 | 79 | 93 | 115 | 117 | 116 | 98 | 79 | 94 | 113 | 100 | 102 | 114 | 97 | 81 |

⇩ 1-BIT SHIFT

Dc ↙   BL1                                              BL2 ↘

| 90 | -1 | 0  | 0  | 76  | 1  | 6  | 8  | 128 | 4  | -5 | -8 | 107 | 5  | -1 | -8 |
|----|----|----|----|-----|----|----|----|-----|----|----|----|-----|----|----|-----|
| 86 | 0  | 0  | 0  | 70  | 14 | (19)| 5 | 136 | -5 | -1 | -3 | 104 | -2 | 2  | 0  |
| 85 | 2  | 8  | 0  | 126 | 0  | -5 | -3 | 106 | -2 | 0  | 0  | 90  | 0  | 6  | 3  |
| 89 | 2  | 5  | 0  | 104 | -6 | -4 | 4  | 111 | 4  | -3 | -9 | 83  | 5  | 6  | -2 |

| 89 | 91 | 85  | 87  | 75  | 73  | 100 | 100 | 135 | 135 | 129 | 106 | 110 | 112 | 122 | 94  |
|----|----|-----|-----|-----|-----|-----|-----|-----|-----|-----|-----|-----|-----|-----|-----|
| 86 | 86 | 84  | 76  | 66  | 96  | 140 | 145 | 140 | 143 | 146 | 127 | 104 | 95  | 113 | 100 |
| 87 | 83 | 111 | 121 | 120 | 135 | 110 | 110 | 111 | 98  | 100 | 106 | 90  | 83  | 112 | 104 |
| 91 | 89 | 108 | 108 | 103 | 95  | 79  | 93  | 115 | 117 | 116 | 98  | 79  | 94  | 113 | 100 |

⇩ LPF (STRONG)

BL1                                                     BL2

| 87 | 87 | 85  | 84  | 84  | 88  | 98  | 106 | 117 | 121 | 121 | 116 | 113 | 111 | 110 | 107 |
|----|----|-----|-----|-----|-----|-----|-----|-----|-----|-----|-----|-----|-----|-----|-----|
| 85 | 84 | 83  | 85  | 91  | 104 | 120 | 128 | 131 | 127 | 123 | 116 | 110 | 106 | 105 | 104 |
| 94 | 97 | 105 | 112 | 117 | 118 | 115 | 111 | 107 | 103 | 100 | 99  | 97  | 97  | 101 | 102 |
| 95 | 96 | 99  | 100 | 99  | 97  | 96  | 99  | 104 | 106 | 105 | 101 | 97  | 98  | 101 | 101 |

⇩ LOSSLESS COMPRESSION

De ↙   BL1                                              BL2

| 87 | 0  | -2 | -1 | 84  | 4  | 10   | 8  | 117 | 4  | 0  | -5 | 113 | -2 | -1 | -3 |
|----|----|----|----|-----|----|------|----|-----|----|----|----|-----|----|----|-----|
| 85 | -1 | -1 | 2  | 91  | 13 | (16) | 8  | 131 | -4 | -4 | -7 | 110 | -4 | -1 | -1 |
| 94 | 3  | 8  | 7  | 117 | 1  | -3   | -4 | 107 | -4 | -3 | -1 | 97  | 0  | 4  | 1  |
| 95 | 1  | 3  | 1  | 99  | -2 | -1   | 3  | 104 | 2  | -1 | -4 | 97  | 1  | 3  | 0  |

F I G . 2 5
Df ⤳  ╭─BL1                    ⇩ 1-BIT SHIFT                    ⤺ BL2
| 87 | 0 | -1 | 0 | 84 | 2 | 5 | 4 | 117 | 2 | 0 | -2 | 113 | -1 | 0 | -1 |
|----|---|----|---|----|---|---|---|-----|---|---|----|-----|----|---|----|
| 85 | 0 | 0 | 1 | 91 | 6 | 8 | 4 | 131 | -2 | -2 | -3 | 110 | -2 | 0 | 0 |
| 94 | 1 | 4 | 3 | 117 | 0 | -1 | -2 | 107 | -2 | -1 | 0 | 97 | 0 | 2 | 0 |
| 95 | 0 | 1 | 0 | 99 | -1 | 0 | 1 | 104 | 1 | 0 | -2 | 97 | 0 | 1 | 0 |
F I G . 2 6
╭─BL1                                                            ⤺ BL2
| 87 | 87 | 85 | 85 | 84 | 88 | 98 | 106 | 117 | 121 | 121 | 117 | 113 | 111 | 111 | 109 |
|----|----|----|----|----|----|----|-----|-----|-----|-----|-----|-----|-----|-----|-----|
| 85 | 85 | 85 | 87 | 91 | 103 | 119 | 127 | 131 | 127 | 123 | 117 | 110 | 106 | 106 | 106 |
| 94 | 96 | 104 | 110 | 117 | 117 | 115 | 111 | 107 | 103 | 101 | 101 | 97 | 97 | 101 | 101 |
| 95 | 95 | 97 | 97 | 99 | 97 | 97 | 99 | 104 | 106 | 106 | 102 | 97 | 97 | 99 | 99 |
F I G . 2 7
╭─BL1                                                            ⤺ BL2
| 0 | 0 | 0 | 1 | 0 | 0 | 0 | 0 | 0 | 0 | 0 | 1 | 0 | 0 | 1 | 2 |
|---|---|---|---|---|---|---|---|---|---|---|---|---|---|---|---|
| 0 | 1 | 2 | 2 | 0 | -1 | -1 | -1 | 0 | 0 | 0 | 1 | 0 | 0 | 1 | 2 |
| 0 | -1 | -1 | -2 | 0 | -1 | 0 | 0 | 0 | 0 | 1 | 2 | 0 | 0 | 0 | -1 |
| 0 | -1 | -2 | -3 | 0 | 0 | 1 | 0 | 0 | 0 | 1 | 1 | 0 | -1 | -2 | -2 |
F I G . 2 8
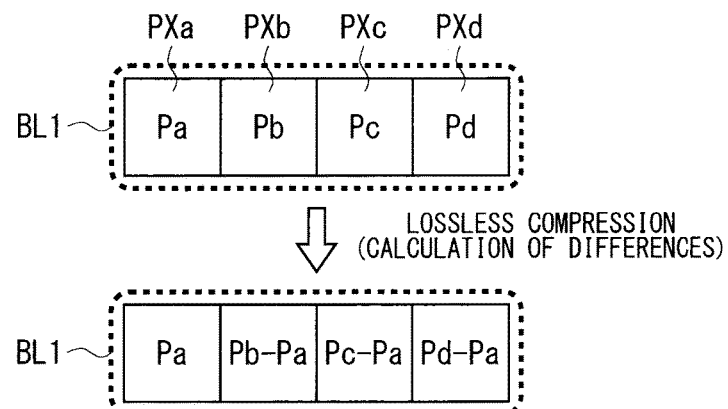

FIG. 29

| | | BL1 | | | | | | | | | | BL2 | | | |
|---|---|---|---|---|---|---|---|---|---|---|---|---|---|---|---|
| 89 | 91 | 85 | 87 | 75 | 73 | 100 | 100 | 135 | 135 | 129 | 106 | 110 | 112 | 122 | 94 |
| 86 | 86 | 84 | 76 | 66 | 96 | 140 | 145 | 140 | 143 | 146 | 127 | 104 | 95 | 113 | 100 |
| 87 | 83 | 111 | 121 | 120 | 135 | 110 | 110 | 111 | 98 | 100 | 106 | 90 | 83 | 112 | 104 |
| 91 | 89 | 108 | 108 | 103 | 95 | 79 | 93 | 115 | 117 | 116 | 98 | 79 | 94 | 113 | 100 |

⇩ LPF (WEAK)

| | | BL1 | | | | | | | | | | BL2 | | | |
|---|---|---|---|---|---|---|---|---|---|---|---|---|---|---|---|
| 90 | 88 | 88 | 83 | 76 | 78 | 91 | 108 | 128 | 136 | 125 | 108 | 107 | 117 | 114 | 98 |
| 86 | 86 | 85 | 73 | 70 | 98 | 137 | 148 | 136 | 126 | 124 | 117 | 104 | 100 | 105 | 104 |
| 85 | 90 | 106 | 119 | 126 | 125 | 115 | 109 | 106 | 101 | 102 | 101 | 90 | 90 | 102 | 108 |
| 89 | 93 | 103 | 109 | 104 | 91 | 83 | 92 | 111 | 120 | 114 | 95 | 83 | 94 | 107 | 103 |

⇩ LOSSLESS COMPRESSION

Db

| | | BL1 | | | | | | | | | | BL2 | | | |
|---|---|---|---|---|---|---|---|---|---|---|---|---|---|---|---|
| 90 | -2 | -2 | -7 | 76 | 2 | 15 | (32) | 128 | 8 | -3 | (-20) | 107 | 10 | 7 | -9 |
| 86 | 0 | -1 | -13 | 70 | (28) | (67) | (78) | 136 | -10 | -12 | (-19) | 104 | -4 | 1 | 0 |
| 85 | 5 | (21) | (34) | 126 | -1 | -11 | (-17) | 106 | -5 | -4 | -5 | 90 | 0 | 12 | (18) |
| 89 | 4 | (14) | (20) | 104 | -13 | (-21) | -12 | 111 | 9 | 3 | -16 | 83 | 11 | (24) | (20) |

FIG. 30

⇩ 1-BIT SHIFT

Dc

| | | BL1 | | | | | | | | | | BL2 | | | |
|---|---|---|---|---|---|---|---|---|---|---|---|---|---|---|---|
| 90 | -1 | -1 | -3 | 76 | 1 | 7 | (16) | 128 | 4 | -1 | -10 | 107 | 5 | 3 | -4 |
| 86 | 0 | 0 | -6 | 70 | 14 | (33) | (39) | 136 | -5 | -6 | -9 | 104 | -2 | 0 | 0 |
| 85 | 2 | 10 | (17) | 126 | 0 | -5 | -8 | 106 | -2 | -2 | -2 | 90 | 0 | 6 | 9 |
| 89 | 2 | 7 | 10 | 104 | -6 | -10 | -6 | 111 | 4 | 1 | -8 | 83 | 5 | 12 | 10 |

F I G . 3 1

Dd ↘  ⟋BL1   ⇓ 2-BIT SHIFT   ⤶ BL2

| 90 | 0 | 0 | −1 | 76 | 0 | 3 | 8 | 128 | 2 | 0 | −5 | 107 | 2 | 1 | −2 |
|---|---|---|---|---|---|---|---|---|---|---|---|---|---|---|---|
| 86 | 0 | 0 | −3 | 70 | 7 | (16) | (19) | 136 | −2 | −3 | −4 | 104 | −1 | 0 | 0 |
| 85 | 1 | 5 | 8 | 126 | 0 | −2 | −4 | 106 | −1 | −1 | −1 | 90 | 0 | 3 | 4 |
| 89 | 1 | 3 | 5 | 104 | −3 | −5 | −3 | 111 | 2 | 0 | −4 | 83 | 2 | 6 | 5 |

F I G . 3 2

⟋BL1   ⤶ BL2

| 89 | 91 | 85 | 87 | 75 | 73 | 100 | 100 | 135 | 135 | 129 | 106 | 110 | 112 | 122 | 94 |
|---|---|---|---|---|---|---|---|---|---|---|---|---|---|---|---|
| 86 | 86 | 84 | 76 | 66 | 96 | 140 | 145 | 140 | 143 | 146 | 127 | 104 | 95 | 113 | 100 |
| 87 | 83 | 111 | 121 | 120 | 135 | 110 | 110 | 111 | 98 | 100 | 106 | 90 | 83 | 112 | 104 |
| 91 | 89 | 108 | 108 | 103 | 95 | 79 | 93 | 115 | 117 | 116 | 98 | 79 | 94 | 113 | 100 |

⇓ LPF (STRONG)

⟋BL1   ⤶ BL2

| 87 | 87 | 85 | 84 | 84 | 88 | 98 | 106 | 117 | 121 | 121 | 116 | 113 | 111 | 110 | 107 |
|---|---|---|---|---|---|---|---|---|---|---|---|---|---|---|---|
| 85 | 84 | 83 | 85 | 91 | 104 | 120 | 128 | 131 | 127 | 123 | 116 | 110 | 106 | 105 | 104 |
| 94 | 97 | 105 | 112 | 117 | 118 | 115 | 111 | 107 | 103 | 100 | 99 | 97 | 97 | 101 | 102 |
| 95 | 96 | 99 | 100 | 99 | 97 | 96 | 99 | 104 | 106 | 105 | 101 | 97 | 98 | 101 | 101 |

⇓ LOSSLESS COMPRESSION

De ↘  ⟋BL1   ⤶ BL2

| 87 | 0 | −2 | −3 | 84 | 4 | 14 | (22) | 117 | 4 | 4 | −1 | 113 | −2 | −3 | −6 |
|---|---|---|---|---|---|---|---|---|---|---|---|---|---|---|---|
| 85 | −1 | −2 | 0 | 91 | 13 | (29) | (37) | 131 | −4 | −8 | −15 | 110 | −4 | −5 | −6 |
| 94 | 3 | 11 | (18) | 117 | 1 | −2 | −6 | 107 | −4 | −7 | −8 | 97 | 0 | 4 | 5 |
| 95 | 1 | 4 | 5 | 99 | −2 | −3 | 0 | 104 | 2 | 1 | −3 | 97 | 1 | 4 | 4 |

FIG. 33

Df ↓  ⌐BL1                          ⇩ 1-BIT SHIFT                    ⌐BL2

| 87 | 0 | -1 | -1 | 84  | 2  | 7  | 11 | 117 | 2  | 2  | 0  | 113 | -1 | -1 | -3 |
| 85 | 0 | -1 | 0  | 91  | 6  | 14 | 18 | 131 | -2 | -4 | -7 | 110 | -2 | -2 | -3 |
| 94 | 1 | 5  | 9  | 117 | 0  | -1 | -3 | 107 | -2 | -3 | -4 | 97  | 0  | 2  | 2  |
| 95 | 0 | 2  | 2  | 99  | -1 | -1 | 0  | 104 | 1  | 0  | -1 | 97  | 0  | 2  | 2  |

FIG. 34

Dg ↓  ⌐BL1                          ⇩ 2-BIT SHIFT                    ⌐BL2

| 87 | 0 | 0 | 0 | 84  | 1 | 3 | 5  | 117 | 1  | 1  | 0  | 113 | 0  | 0  | -1 |
| 85 | 0 | 0 | 0 | 91  | 3 | 7 | 9  | 131 | -1 | -2 | -3 | 110 | -1 | -1 | -1 |
| 94 | 0 | 2 | 4 | 117 | 0 | 0 | -1 | 107 | -1 | -1 | -2 | 97  | 0  | 1  | 1  |
| 95 | 0 | 1 | 1 | 99  | 0 | 0 | 0  | 104 | 0  | 0  | 0  | 97  | 0  | 1  | 1  |

| 87 | 87 | 87  | 87  | 84  | 88  | 96  | 104 | 117 | 121 | 121 | 117 | 113 | 113 | 113 | 109 |
| 85 | 85 | 85  | 85  | 91  | 103 | 119 | 127 | 131 | 127 | 123 | 119 | 110 | 106 | 106 | 106 |
| 94 | 94 | 102 | 110 | 117 | 117 | 117 | 113 | 107 | 103 | 103 | 99  | 97  | 97  | 101 | 101 |
| 95 | 95 | 99  | 99  | 99  | 99  | 99  | 99  | 104 | 104 | 104 | 104 | 97  | 97  | 101 | 101 |

| 0 | 0  | 2  | 3  | 0 | 0  | -2 | -2 | 0 | 0  | 0  | 1 | 0 | 2  | 3 | 2  |
| 0 | 1  | 2  | 0  | 0 | -1 | -1 | -1 | 0 | 0  | 0  | 3 | 0 | 0  | 1 | 2  |
| 0 | -3 | -3 | -2 | 0 | -1 | 2  | 2  | 0 | 0  | 3  | 0 | 0 | 0  | 0 | -1 |
| 0 | -1 | 0  | -1 | 0 | 2  | 3  | 0  | 0 | -2 | -1 | 3 | 0 | -1 | 0 | 0  |

F I G . 3 7
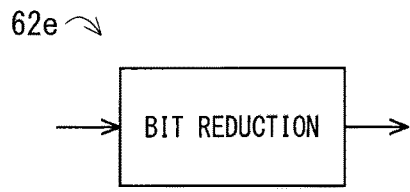
F I G . 3 8
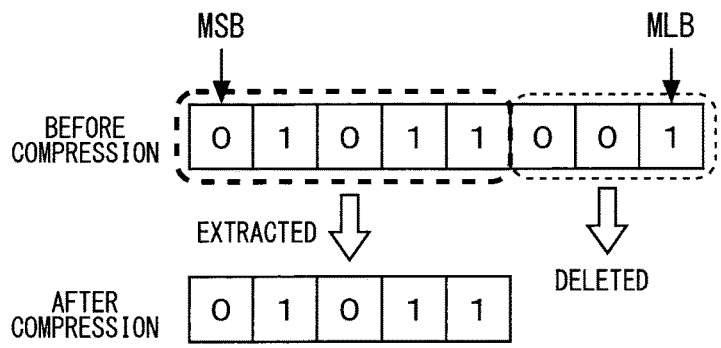
F I G . 3 9
| BL1 | | | | | | | | | | | | BL2 | | | |
|---|---|---|---|---|---|---|---|---|---|---|---|---|---|---|---|
| 89 | 91 | 85 | 87 | 75 | 73 | 100 | 100 | 135 | 135 | 129 | 106 | 110 | 112 | 122 | 94 |
| 86 | 86 | 84 | 76 | 66 | 96 | 140 | 145 | 140 | 143 | 146 | 127 | 104 | 95 | 113 | 100 |
| 87 | 83 | 111 | 121 | 120 | 135 | 110 | 110 | 111 | 98 | 100 | 106 | 90 | 83 | 112 | 104 |
| 91 | 89 | 108 | 108 | 103 | 95 | 79 | 93 | 115 | 117 | 116 | 98 | 79 | 94 | 113 | 100 |
⇩ BIT REDUCTION → RECONSTRUCTION
| BL1 | | | | | | | | | | | | BL2 | | | |
|---|---|---|---|---|---|---|---|---|---|---|---|---|---|---|---|
| 88 | 88 | 80 | 80 | 72 | 72 | 96 | 96 | 128 | 128 | 128 | 104 | 104 | 112 | 120 | 88 |
| 80 | 80 | 80 | 72 | 64 | 96 | 144 | 144 | 136 | 120 | 120 | 120 | 104 | 88 | 112 | 96 |
| 80 | 80 | 104 | 120 | 120 | 128 | 104 | 104 | 104 | 96 | 96 | 104 | 88 | 80 | 112 | 104 |
| 88 | 88 | 104 | 104 | 96 | 88 | 72 | 88 | 112 | 112 | 112 | 96 | 72 | 88 | 112 | 96 |

FIG. 40

| | | ⌐BL1 | | | | | | | | | ⌙BL2 | | |
|---|---|---|---|---|---|---|---|---|---|---|---|---|---|
| 1 | 3 | 5 | 7 | 3 | 1 | 4 | 4 | 7 | 7 | 1 | 2 | 6 | 0 | 2 | 6 |
| 6 | 6 | 4 | 4 | 2 | 0 | 1 | 1 | 4 | 6 | 4 | 0 | 0 | 7 | 1 | 4 |
| 7 | 3 | 7 | 1 | 0 | 7 | 6 | 6 | 7 | 2 | 4 | 2 | 2 | 3 | 0 | 0 |
| 3 | 1 | 4 | 4 | 7 | 7 | 7 | 5 | 3 | 5 | 4 | 2 | 7 | 6 | 1 | 4 |

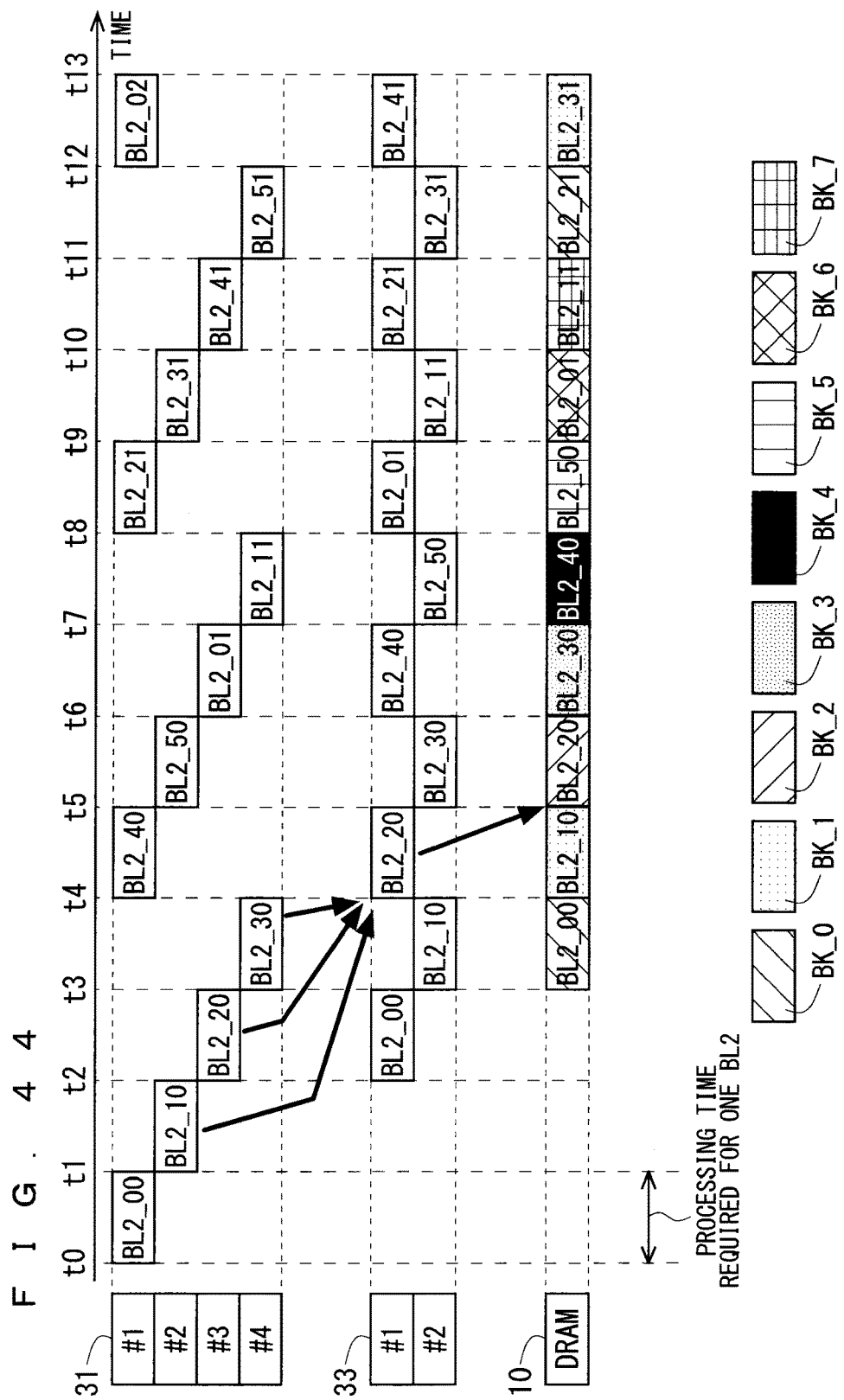

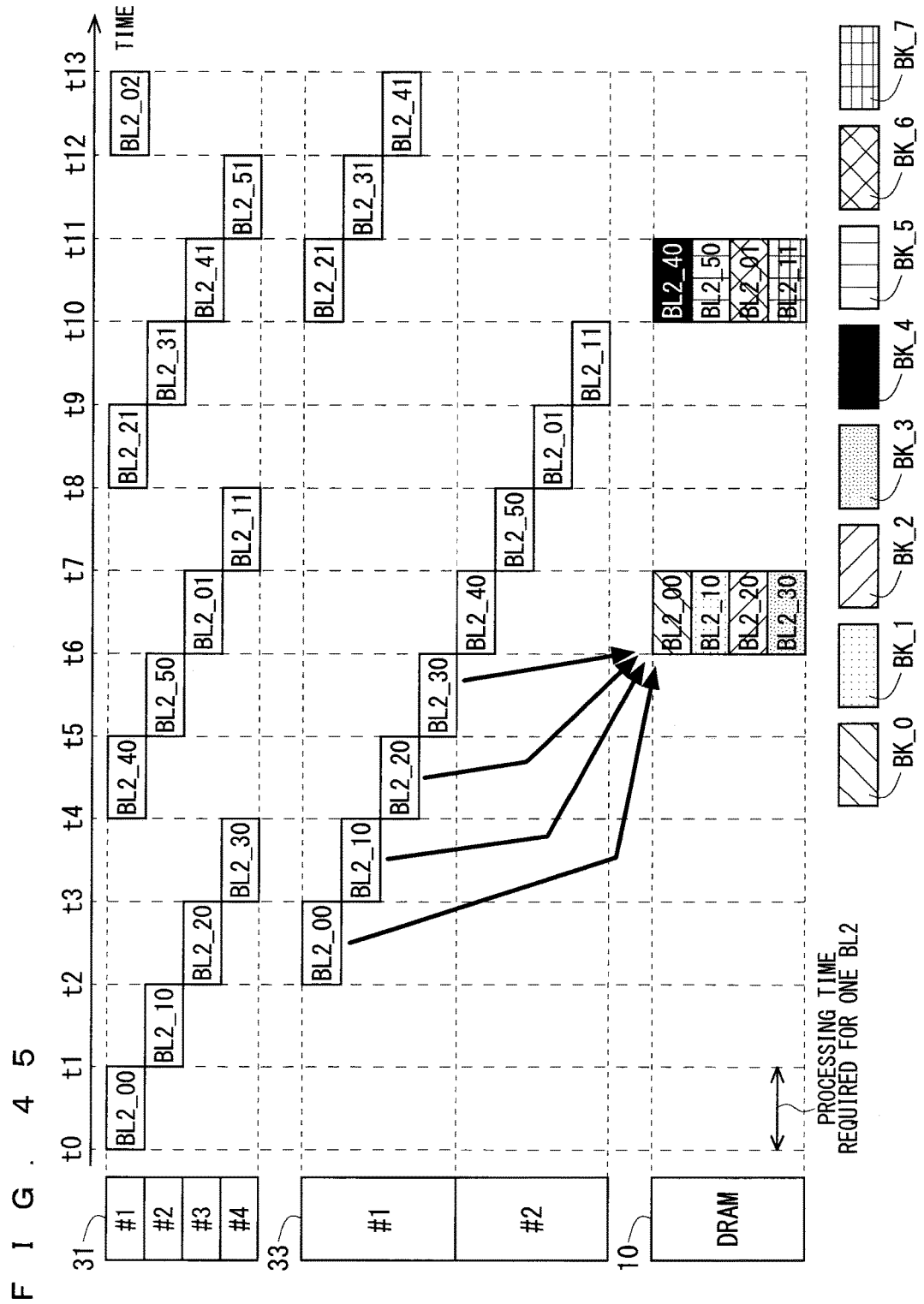

DATA STORAGE CONTROL APPARATUS AND DATA STORAGE CONTROL METHOD

BACKGROUND OF THE INVENTION

Field of the Invention

The present invention relates to a data storage control apparatus and a data storage control method.

Description of the Background Art

Various techniques are related to data storage.

For example, image data of still images and moving images is compressed to reduce the amount of data. Japanese Patent Application Laid-Open No. 2009-260977 describes a technique for compressing video data to a smaller size, using a combination of irreversible compression and reversible compression. Japanese Patent Application Laid-Open No. 2013-135254 describes a technique that is highly likely to be able to reduce the amount of data while generating lossless data without data degradation.

Japanese Patent Gazette No. 5147102 describes a technique for accessing memory that includes a plurality of banks and that requires an interval equal to or longer than a predetermined number of clock cycles between two successive accesses that are made to the same bank.

Various demands are made of data storage technology. Examples include demands for a reduced amount of memory capacity that is used and for efficient use of memory. The techniques of the above-described three documents (Japanese Patent Application Laid-Open Nos. 2009-260977 and 2013-135254 and Japanese Patent Gazette No. 5147102) are considered examples of techniques that have been developed to meet the above demands.

SUMMARY OF THE INVENTION

It is an object of the present invention to achieve either a reduction in the use amount of memory capacity or efficient use of memory, for example, with a technique that is completely different from conventional techniques.

A data storage control apparatus according to a first aspect of the present invention includes a compressor that compresses image data and outputs compressed data, and a writing controller that writes the compressed data as write data to a memory. The compressor includes a compressed data generator that includes a lossless compressor for performing lossless compression and a lossy compressor for performing lossy compression, and that compresses, by using the lossless compressor and the lossy compressor, the image data in units of first blocks, each being an image block of a predetermined area size, to generate a plurality of types of compressed data in parallel or in series, and a selector that performs selection processing on each second block that includes a predetermined number N of the first blocks, where N is an integer of 1 or more, the selection processing involving determining whether each of the plurality of types of compressed data generated by the compressed data generator satisfies a predetermined selection condition and selecting one piece of compressed data that satisfies the predetermined selection condition. The predetermined selection condition includes a data size condition that a data size of all of the first blocks included in the second block is less than or equal to a predetermined value, and a data accuracy condition that information maintaining accuracy is highest among the compressed data that satisfies the data size condition. The writing controller writes the one piece of compressed data selected by the selector as the write data to the memory.

A data storage control apparatus according to a second aspect of the present invention is the data storage control apparatus of the first aspect in which the lossless compression is processing for obtaining a difference in pixel value between a compression target pixel and a standard pixel and assigning a resultant difference value to the compression target pixel, and the lossless compressor defines the compression target pixel and the standard pixel in the first block in accordance with a predetermined pixel classification and performs the lossless compression on the compression target pixel and the standard pixel that have been defined.

A data storage control apparatus according to a third aspect of the present invention is the data storage control apparatus of the second aspect in which the predetermined pixel classification includes a first pixel classification according to which pairs of pixels are sequentially selected in the first block, each of pairs including pixels adjacent to each other in the first block that are defined with one pixel as the compression target pixel and the other pixel as the standard pixel.

A data storage control apparatus according to a fourth aspect of the present invention is the data storage control apparatus of either the second or third aspect in which the predetermined pixel classification includes a second pixel classification according to which a pixel at a predetermined fixed position in the first block is defined as the standard pixel, and each pixel at a position other than the fixed position in the first block is defined as the compression target pixel.

A data storage control apparatus according to a fifth aspect of the present invention is the data storage control apparatus of one of the first to fourth aspects in which the lossy compressor includes a plurality of lossy compression processors that perform different types of lossy compression.

A data storage control apparatus according to a sixth aspect of the present invention is the data storage control apparatus of one of the second to fourth aspects in which the lossy compressor includes at least one of a first lossy compression processor that generates first compressed data by performing first low-pass processing using a first low-pass filter on compression target data, a second lossy compression processor that generates second compressed data by performing the first low-pass processing and the lossless compression in this order on the compression target data, and a third lossy compression processor that generates at least one piece of third compressed data by performing the first low-pass processing and the lossless compression in this order on the compression target data and performing a first bit shift processing in which a bit of the difference value obtained from the lossless compression is shifted toward the least significant bit.

A data storage control apparatus according to a seventh aspect of the present invention is the data storage control apparatus of the sixth aspect in which the at least one piece of third compressed data is a plurality of pieces of third compressed data that are generated by using different shift amounts in the first bit shift processing.

A data storage control apparatus according to an eighth aspect of the present invention is the data storage control apparatus of the sixth or seventh aspect in which the lossless compression performed by at least one of the second lossy compression processor and the third lossy compression processor uses a compression technique different from a technique used in the lossless compression performed by the lossless compressor.

A data storage control apparatus according to a ninth aspect of the present invention is the data storage control apparatus of one of the sixth to eighth aspects in which the lossy compressor further includes at least one of a fourth lossy compression processor that generates fourth compressed data by performing second low-pass processing using a second low-pass filter on the compression target data, the second low-pass filter having a different strength from the first low-pass filter, a fifth lossy compression processor that generates fifth compressed data by sequentially performing the second low-pass processing and the lossless compression on the compression target data, and a sixth lossy compression processor that generates at least one piece of sixth compressed data by performing the second low-pass processing and the lossless compression in this order on the compression target data and performing a second bit shift processing in which a bit of the difference value obtained from the lossless compression is shifted toward the least significant bit.

A data storage control apparatus according to a tenth aspect of the present invention is the data storage control apparatus of the ninth aspect in which the at least one piece of sixth compressed data is a plurality of pieces of sixth compressed data that are generated by using different shift amounts in the second bit shift processing.

A data storage control apparatus according to an eleventh aspect of the present invention is the data storage control apparatus of either the ninth or tenth aspect in which the lossless compression performed by at least one of the fifth lossy compression processor and the sixth lossy compression processor uses a compression technique different from a technique used in the lossless compression performed by the lossless compressor.

A data storage control apparatus according to a twelfth aspect of the present invention is the data storage control apparatus of one of the first to eleventh aspects in which the lossy compressor includes a seventh lossy compression processor that generates seventh compressed data by performing bit-reduction processing on a compression target pixel in compression target data, the bit-reduction processing involves deleting a predetermined range of bits from the least significant bit side of a bit string that represents the pixel value to reduce the number of bits of the pixel value, and the predetermined range is set such that the seventh compressed data always satisfies the data size condition.

A data storage control apparatus according to a thirteenth aspect of the present invention is the data storage control apparatus of one of the first to twelfth aspects in which the lossless compressor and the lossy compressor operate in parallel.

A data storage control apparatus according to a fourteenth aspect of the present invention is the data storage control apparatus of one of the first to thirteenth aspects that further includes an input buffer memory that temporarily stores the image data that is to be supplied to the compressor. The lossless compression or the lossy compression includes reference-type processing that uses, as a reference object, a first block that is not set to a compression object among the first blocks, and the input buffer memory stores the image data of a first block that is scheduled to be used as either the compression object or the reference object, and frees a storage area allocated to a first block that is no longer scheduled to be used as either the compression object or the reference object, at a predetermined timing.

A data storage control apparatus according to a fifteenth aspect of the present invention is the data storage control apparatus of the fourteenth aspect in which the compressor acquires the image data in units of third blocks, each including a predetermined number X of the second blocks, where X is an integer of 1 or more, from the input buffer memory, and the input buffer memory manages the storage area in association with the third blocks.

A data storage control apparatus according to a sixteenth aspect of the present invention is the data storage control apparatus of either the fourteenth or fifteenth aspect that further includes an output buffer memory that temporarily stores the write data that is output from the compressor for the supply to the writing controller. The memory includes a plurality of banks, and the writing controller writes the write data to the memory while switching the plurality of banks every piece of the write data.

A data storage control apparatus according to a seventeenth aspect of the present invention is the data storage control apparatus of the sixteenth aspect in which the writing controller waits for Y banks' worth of the write data to be accumulated in the output buffer memory, where Y is an integer of 2 or more, and collectively writes the Y banks' worth of the write data to the memory.

A data storage control apparatus according to an eighteenth aspect of the present invention is the data storage control apparatus of one of the fourteenth to seventeenth aspects in which upstream of the input buffer memory, image processing is performed in units of microblocks, and a predetermined number V of the second blocks corresponds to a predetermined number W of the microblocks, where V and W are integers of 1 or more.

A data storage control method according to a nineteenth aspect of the present invention includes (a) compressing image data and outputting compressed data, and (b) writing the compressed data as write data in a memory. The step (a) includes (a-1) compressing, by using lossless compression and lossy compression, the image data in units of first blocks, each being an image block of a predetermined area size, to generate a plurality of types of compressed data in parallel or in series, and (a-2) performing selection processing on each second block that includes a predetermined number N of the first blocks, where N is an integer of 1 or more, the selection processing involving determining whether each of the plurality of types of compressed data generated in the step (a-1) satisfies a predetermined selection condition, and selecting one piece of compressed data that satisfies the predetermined selection condition. The predetermined selection condition includes a data size condition that a data size of all of the first blocks included in the second block is less than or equal to a predetermined value, and a data accuracy condition that information maintaining accuracy is highest among the compressed data that satisfies the data size condition. In the step (b), the one piece of compressed data selected in the step (a-2) is written as the write data in the memory.

A data storage control apparatus according to a twentieth aspect of the present invention includes a compressor that compresses image data and outputs compressed data, a writing controller that writes the compressed data as write data in a memory, and an input buffer memory that temporarily stores the image data that is to be supplied to the compressor. The compressor compresses the image data in units of first blocks, each being an image block of a predetermined area size, and outputs the compressed data in units of second blocks, each including a predetermined number N of the first blocks, where N is an integer of 1 or more, processing performed by the compressor includes reference-type processing that uses, as a reference object, a first block that is not set to a compression object among the first blocks, and the input buffer memory stores the image data of a first block that is scheduled to be used as either the compression object or the reference object, and frees a storage area allocated to a first block that is no longer scheduled to be used as either the compression object or the reference object, at a predetermined timing.

A data storage control apparatus according to a twenty-first aspect of the present invention is the data storage control apparatus of the twentieth aspect in which the compressor acquires the image data in units of third blocks, each including a predetermined number X of the second blocks, where X is an integer of 1 or more, from the input buffer memory, and the input buffer memory manages the storage area in association with the third blocks.

A data storage control apparatus according to a twenty-second aspect of the present invention is the data storage control apparatus of either the twentieth or twenty-first aspect that further includes an output buffer memory that temporarily stores the write data that is output from the compressor for the supply to the writing controller. The memory includes a plurality of banks, and the writing controller writes the write data to the memory while switching the plurality of banks every piece of the write data.

A data storage control apparatus according to a twenty-third aspect of the present invention is the data storage control apparatus of the twenty-second aspect in which the writing controller waits for Y banks' worth of the write data to be accumulated in the output buffer memory, where Y is an integer of 2 or more, and collectively writes the Y banks' worth of the write data to the memory.

A data storage control apparatus according to a twenty-fourth aspect of the present invention is the data storage control apparatus of one of the twentieth to twenty-third aspects in which upstream of the input buffer memory, image processing is performed in units of macroblocks, and a predetermined number V of the second blocks corresponds to a predetermined number W of the microblocks, where V and W are integers of 1 or more.

A data storage control method according to a twenty-fifth aspect of the present invention includes (a) compressing image data and outputting compressed data, (b) writing the compressed data as write data to a memory, and (c) temporarily storing the image data used in the step (a) in an input buffer memory. The step (a) includes compressing the image data in units of first blocks, each being an image block of a predetermined area size, and outputting the compressed data in units of second blocks, each including a predetermined number N of the first blocks, where N is an integer of 1 or more. The step (a) includes reference-type processing that uses, as a reference object, a first block that is not set to a compression object among the first blocks. The step (c) includes storing the image data of a first block that is scheduled to be used as either the compression object or the reference object in the input buffer memory, and freeing a storage area of the input buffer memory that is allocated to a first block that is no longer scheduled to be used as either the compression object or the reference object, at a predetermined timing.

According to the above-described first and nineteenth aspects, the use amount of memory capacity can more reliably be reduced. The same effect can also be achieved by the second to eighteenth aspects that are based on the first aspect.

According to the above-described twentieth and twenty-fifth aspects, the input buffer memory can be used efficiently. The same effect can also be achieved by the twenty-first to twenty-fourth aspects that are based on the twentieth aspect.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram illustrating a data storage control apparatus according to the first preferred embodiment;

FIG. 3 illustrates processing blocks (for a Y component) according to the first preferred embodiment;

FIG. 4 illustrates processing blocks (for Cb and Cr components) according to the first preferred embodiment;

FIG. 17 illustrates a first example of numerical values (for the Y component) according to the first preferred embodiment;

FIG. 18 illustrates the first example of numerical values (for the Cb component) according to the first preferred embodiment;

FIG. 19 illustrates the first example of numerical values (for the Cr component) according to the first preferred embodiment;

FIGS. 20 to 27 illustrate a second example of numerical values according to the first preferred embodiment;

FIG. 28 is a conceptual diagram illustrating a second example of lossless compression according to the first preferred embodiment;

FIGS. 29 to 36 illustrate a third example of numerical values according to the first preferred embodiment;

FIG. 37 is a block diagram illustrating a fifth example of the lossy compression processor according to the first preferred embodiment;

FIG. 38 is a conceptual diagram illustrating the fifth example of the lossy compression processor according to the first preferred embodiment;

FIGS. 39 and 40 illustrate an example of numerical values with the fifth example of the lossy compression processor according to the first preferred embodiment;

FIG. 44 illustrates a second example of data transfer control according to the second preferred embodiment; and FIG. 45 illustrates a third example of data transfer control according to the second preferred embodiment.

DESCRIPTION OF PREFERRED EMBODIMENTS

First Preferred Embodiment

Encoding Apparatus

Figure 1:
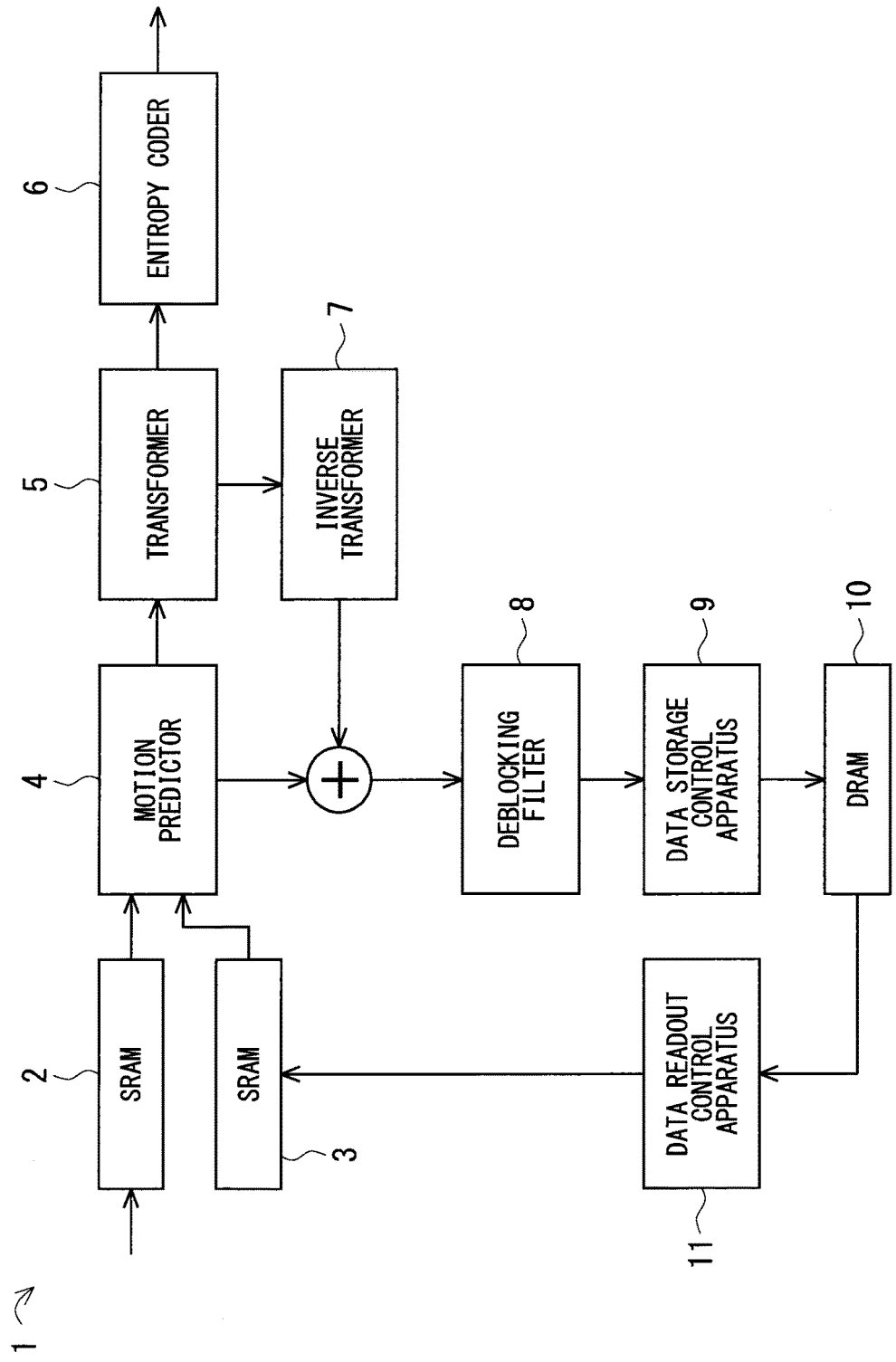
FIG. 1 is a block diagram illustrating an encoding apparatus according to a first preferred embodiment.

FIG. 1 is a block diagram illustrating an example of an encoding apparatus 1 according to a first preferred embodiment. The encoding apparatus 1 is configured to be compliant with a format such as H.264, Moving Picture Experts Group-2 (MPEG-2), and MPEG-4, and performs compression processing (in other words, encoding processing) on moving image data.

In the example in FIG. 1, a motion predictor 4 reads out image data to be encoded from a storage unit 2, reads out reference image data to be used in motion prediction from storage unit 3, and performs a motion prediction on the basis of these image data. The motion prediction is performed in units of so-called macroblocks. Here, an example is given in which the storage units 2 and 3 are static random access memories (SRAMs), and the storage unit 2 and storage unit 3 are also referred to as "SRAM 2" and "SRAM 3", respectively.

Data resulting from the motion prediction is transformed by a transformer 5 using, for example, a discrete cosine transform (DCT) technique. The transformer 5 further quantizes resultant transform coefficients (so-called DCT coefficients). The quantized transform coefficients are encoded by an entropy coder 6 using entropy coding, and output as a bit stream of compressed image data from the entropy coder 6. Note that the entropy coding uses a technique such as context-based adaptive binary arithmetic coding (CABAC) or context-based adaptive variable length coding (CAVLC).

The quantized transform coefficients are also supplied to an inverse transformer 7. The inverse transformer 7 performs the opposite processing to that of the transformer 5, i.e., inverse quantization and inverse DCT, to generate a residual signal about a result of the motion prediction. The residual signal is combined with predicted image data supplied from the motion predictor 4, and then input to a deblocking filter 8. The deblocking filter 8 performs deblocking processing, i.e., processing for reducing block noise that occurs at boundaries between microblocks.

Deblocked image data is stored in a storage unit 10 by a data storage control apparatus 9. Here, an example is given in which the storage unit 10 is a dynamic random access memory (DRAM), and the storage unit 10 is also referred to as a "DRAM 10." Image data stored in the DRAM 10 is read out by a data readout control apparatus 11 and stored as reference image data in the SRAM 3.

The data storage control apparatus 9 compresses the reference image data (more specifically, deblocked reference image data in the example in FIG. 1), which is generated within the encoding apparatus 1, before storing it in the DRAM 10. On the other hand, the data readout control apparatus 11 reconstructs the compressed data stored in the DRAM 10, before storing it in the SRAM 3. Note that the data storage control apparatus 9 and the data readout control apparatus 11 are also applicable to apparatuses that have different configurations from that in the example in FIG. 1.

Overview of Data Storage Control Apparatus

FIG. 2 is a block diagram illustrating an example of the data storage control apparatus 9. In the example in FIG. 2, the data storage control apparatus 9 includes an input buffer memory 31, a compressor 32, an output buffer memory 33, and a writing controller 34. In the following description, the buffer memory is also simply referred to as "buffer."

The input buffer 31 is configured of an SRAM, for example. The input buffer 31 temporarily stores image data to be supplied to the compressor 32. In the present example, the image data to be supplied to the compressor 32 is reference image data (more specifically, deblocked reference image data).

Here, an example is given in which an image is represented by Y, Cb, and Cr components. In this case, image data refers to each of image data of the Y component, image data of the Cb component, and image data of the Cr component. Note that the data storage control apparatus 9 is also applicable to examples in which the image is represented by other components.

The compressor 32 includes a compressed data generator 41 and a selector 42.

The compressed data generator 41 is configured to be capable of generating a plurality of types of compressed data from the image data acquired via the input buffer 31. More specifically, the compressed data generator 41 includes a lossless compressor 51 that performs lossless compression and a lossy compressor 52 that performs lossy compression. Note that lossless compression is also called "reversible compression," and lossy compression is also called "irreversible compression."

The compressed data generator 41 causes the lossless compressor 51 and the lossy compressor 52 to compress image data and generate a plurality of types of compressed data. The compressed data generator 41 may be configured to generate some or all of the plurality of types of compressed data in parallel (in other words, simultaneously), or may be configured to generate them in series (in other words, sequentially).

The selector 42 performs predetermined selection processing on various types of compressed data generated by the compressed data generator 41. Specifically, the selection processing involves determining whether each type of compressed data generated by the compressed data generator 41 satisfies a predetermined selection condition, and selecting one piece of compressed data that satisfies the predetermined selection condition.

The above selection condition includes a data size condition and a data accuracy condition. The data size condition is that the data size is less than or equal to a predetermined value. The data accuracy condition is that information maintaining accuracy is highest among compressed data pieces that satisfy the data size condition. The information maintaining accuracy expresses to what extent information provided by uncompressed image data is maintained after compression and reconstruction. The information maintaining accuracy may be referred to as reconstruction accuracy.

The output buffer 33 temporarily stores compressed data selected by the selector 42, i.e., compressed data output from the compressor 32, and supplies the stored data to the writing controller 34.

The writing controller 34 writes the compressed data stored in the output buffer 33 as write data to the storage unit 10 (see FIG. 1). In the example where the storage unit 10 is a DRAM, the writing controller 34 may be configured of a so-called DRAM controller. In the following description, the writing controller 34 is thus also referred to as a "DRAM controller 34."

Here, the data storage control apparatus 9 processes image data in units of image blocks. Such processing blocks are illustrated in FIGS. 3 and 4. FIG. 3 illustrates image data of the Y component, and FIG. 4 illustrates image data of the Cb and Cr components. As illustrated in FIGS. 3 and 4, the data storage control apparatus 9 uses two types of image blocks, namely, first blocks BL1 and second blocks BL2.

Here, an example is given in which the image data of the Y component (see FIG. 3) includes first blocks BL1 that each have an area size of 4×1 pixels, and second blocks BL2 that each have an area size of 16×4 pixels. In this case, the second blocks BL2 each include 4×4 first blocks BL1. In other words, the second blocks BL2 each can be divided into 16 first blocks BL1.

Also, an example is given in which the image data of the Cb and Cr components (see FIG. 4) includes first blocks BL1 that each have an area size of 8×1 pixels, and second blocks BL2 that each have an area size of 8×2 pixels. In this case, the second blocks BL2 each include 1×2 first blocks BL1. In other words, the second blocks BL2 each can be divided into two first blocks BL1.

The second blocks BL2 each include N (N is an integer of 1 or more) first blocks BL1, and in the examples in FIGS. 3 and 4, N is 2 or more. Alternatively, N may be 1, in which case the second blocks BL2 have the same area size as the first blocks BL1.

Note that a macroblock MB (see FIGS. 3 and 4) used in formats such as H.264 and MPEG is set to have an area size of 16×16 or 8×8 pixels, for example. When the encoding apparatus 1 is compliant with formats such as H.264 and MPEG, for example, the input buffer 31 receives input of image data in units of such macroblocks MB.

For example, the compressed data generator 41 performs lossless compression and lossy compression on each of the first blocks BL1, and the selector 42, for example, performs selection processing on each of the second blocks BL2.

The following describes a more specific example of the data storage control apparatus 9.

Lossless Compressor

Figure 5:
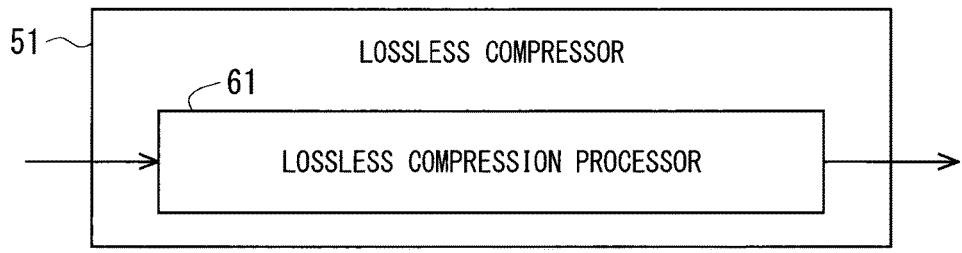
FIG. 5 is a block diagram illustrating an example of a lossless compressor according to the first preferred embodiment.

FIG. 5 illustrates an example of the lossless compressor 51. In the example in FIG. 5, the lossless compressor 51 includes a lossless compression processor 61 that performs predetermined lossless compression in units of first blocks BL1.

Figure 6:
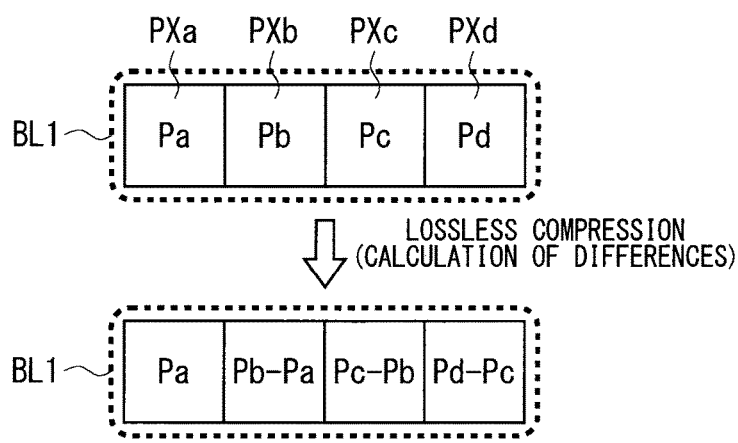
FIG. 6 is a conceptual diagram illustrating a first example of lossless compression according to the first preferred embodiment.

FIG. 6 illustrates an example of lossless compression performed by the lossless compression processor 61. FIG. 6 illustrates a first block BL1 of the Y component, and for ease of description, four pixels PX that constitute the first block BL1 are respectively referred to as PXa, PXb, PXc, and PXd in order from the left. Pixel values (in other words, pixel data) P of the pixels PXa, PXb, PXc, and PXd are respectively referred to as Pa, Pb, Pc, and Pd.

In the example in FIG. 6, the pixel value Pa of the pixel PXa remains unchanged even after compression. On the other hand, the pixel value of the pixel PXb is converted to {Pb−Pa}, the pixel value of the pixel PXc is converted to {Pc−Pb}, and the pixel value of the pixel PXd is converted to {Pd−Pc}.

Specifically, the lossless compression processor 61 sequentially defines a compression target pixel and a standard pixel according to a pixel classification in which pairs of pixels PX adjacent to each other in the first block BL1 are defined with one pixel as a compression target pixel and the other pixel as a standard pixel, and these pairs of pixels are sequentially selected in the first block BL1. The lossless compression processor 61 then performs lossless compression, which involves obtaining a difference in pixel value between the compression target pixel and the standard pixel and assigning the resultant difference value to the compression target pixel. While, in the example in FIG. 6, the left pixel PX among these pairs of pixels PX is set as the standard pixel, the right pixel PX may be set as the standard pixel. Note that the same lossless compression can also be performed on the image data of the Cb and Cr components.

Note that the lossless compression processor 61 may adopt other types of lossless compression. Alternatively, the lossless compressor 51 may include a plurality of lossless compression processors 61 that perform different types of lossless compression.

Lossy Compressor

Figure 7:
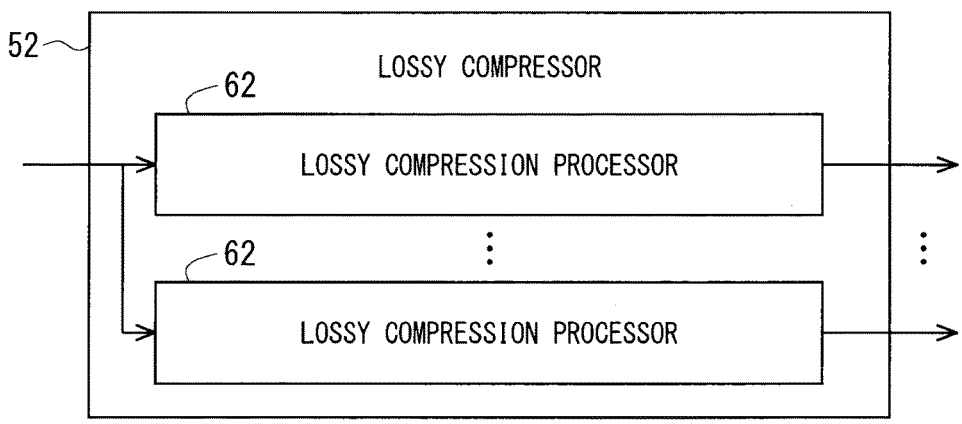
FIG. 7 is a block diagram illustrating an example of a lossy compressor according to the first preferred embodiment.

FIG. 7 illustrates an example of the lossy compressor 52. In the example in FIG. 7, the lossy compressor 52 includes a plurality of lossy compression processors 62 that perform different types of lossy compression. First to fourth examples of the lossy compression processors 62 will now be described with reference to FIGS. 8 to 12.

Figure 8:
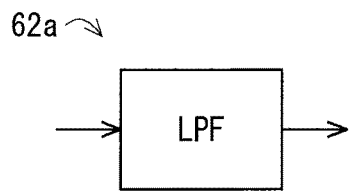
FIG. 8 is a block diagram illustrating a first example of a lossy compression processor according to the first preferred embodiment.

As illustrated in FIG. 8, a lossy compression processor 62a according to the first example generates compressed data by performing processing using a low-pass filter (LPF), i.e., low-pass processing, on compression target data. The low-pass processing is one type of lossy compression. One example of a low-pass filter is a horizontal low-pass filter.

As an example, a 9-tap horizontal low-pass filter will be described with reference to FIG. 9. Here, assumed that a pixel of interest has a pixel value P4, the four pixels on the left side of the pixel of interest respectively have pixel values P0 to P3, and the four pixels on the right side of the pixel of interest respectively have pixel values P5 to P8. It is also assumed that these nine pixels have LPF coefficients C0 to C8. In this case, the pixel of interest that has undergone low-pass processing is assigned a value that is calculated from the equation in FIG. 9.

By sequentially setting each pixel in the first block BL1 as a pixel of interest, the low-pass processing on the first block BL1 is completed. Note that in the example in FIG. 9, pixel values in other first blocks BL1 that are adjacent to the first block BL1 to be compressed are also referenced.

Figure 10:
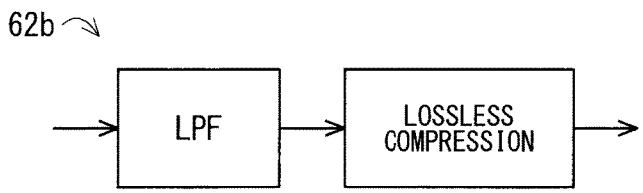
FIG. 10 is a block diagram illustrating a second example of the lossy compression processor according to the first preferred embodiment.

As illustrated in FIG. 10, a lossy compression processor 62b according to the second example generates compressed data by performing low-pass processing and lossless compression in this order on compression target data. Here, it is assumed that the low-pass processing is the same as that performed by the lossy compression processor 62a (see FIG. 8), and the lossless compression is the same as that performed by the lossless compression processor 61 (see FIG. 5).

Figure 11:
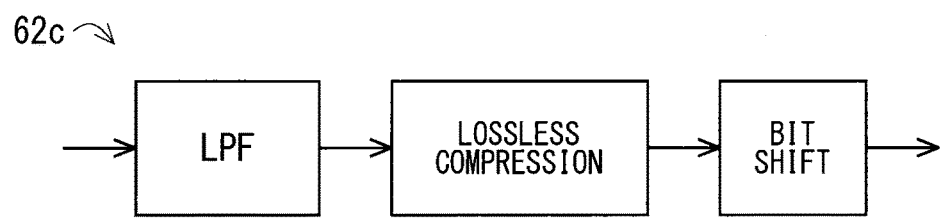
FIG. 11 is a block diagram illustrating a third example of the lossy compression processor according to the first preferred embodiment.

As illustrated in FIG. 11, a lossy compression processor 62c according to the third example generates compressed data by performing low-pass processing, lossless compression, and a bit shift processing in this order on compression target data. Here, it is assumed that the low-pass processing and the lossless compression are the same as those performed by the lossy compression processor 62b (see FIG. 10). The bit shift processing involves shifting difference values obtained from the lossless compression (more specifically, a bit string obtained by representing the difference values in binary) by a predetermined shift amount toward the least significant bit (LSB). In the following description, a bit shift toward the least significant bit is also referred to as a "right bit shift" or a "right shift."

Using different shift amounts makes it possible to generate a plurality of pieces of compressed data from one piece of compression target data, as in a lossy compression processor 62d (see FIG. 12) according to the fourth example.

The lossy compression processors 62 may also adopt configurations other than those in the first to fourth examples. For example, the lossy compression processors 62b to 62d may omit the LPF processing (see FIGS. 10 to 12). Also, changing the strength of the LPF can configure another lossy compression processor 62. Note that the strength of the LPF is adjustable by controlling the LPF coefficients.

Specific Example of Compressed Data Generator

Figure 13:
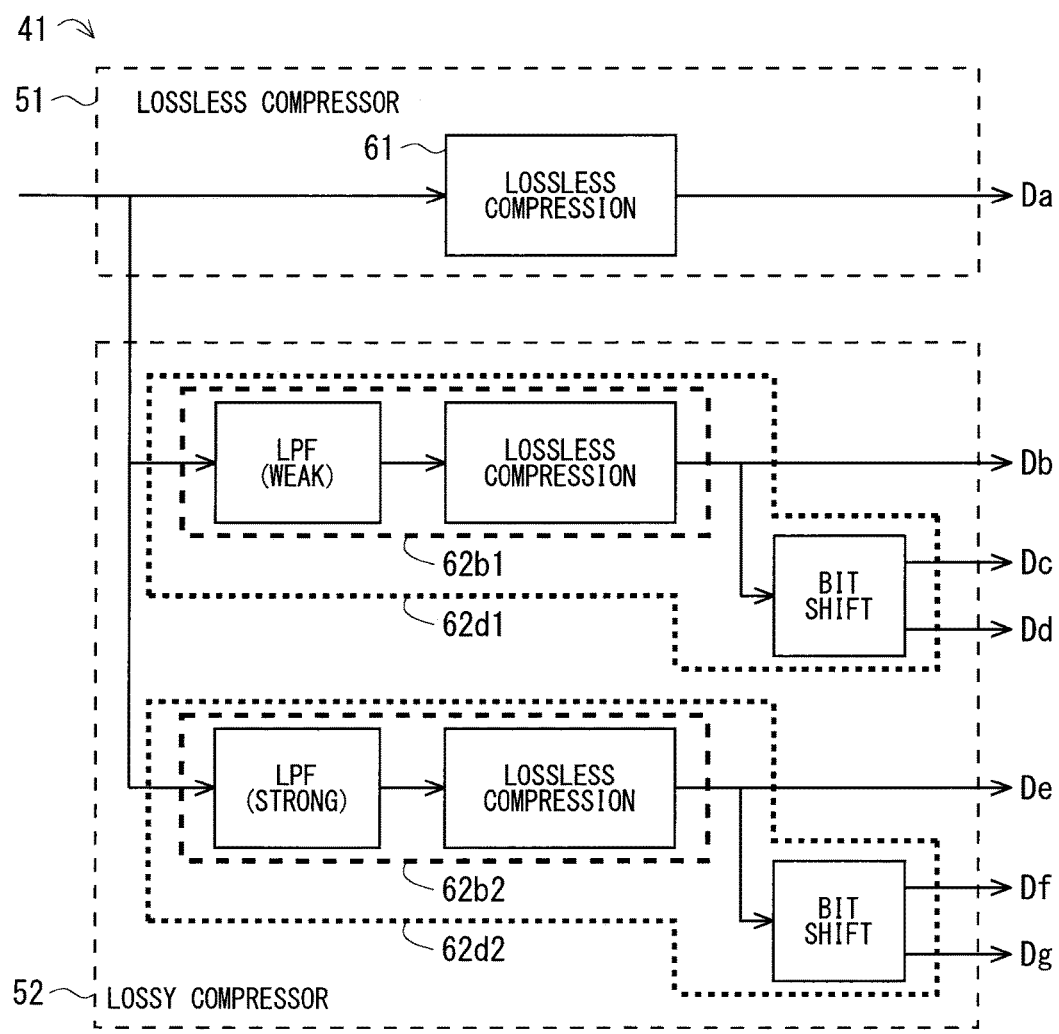
FIG. 13 is a block diagram illustrating an example of a compressed data generator according to the first preferred embodiment.

FIG. 13 is a block diagram illustrating an example of the compressed data generator 41. In the example in FIG. 13, the lossless compressor 51 is assumed to be configured as in the examples in FIGS. 5 and 6. In the example in FIG. 13, the lossy compressor 52 includes four lossy compression processors 62.

Figure 12:
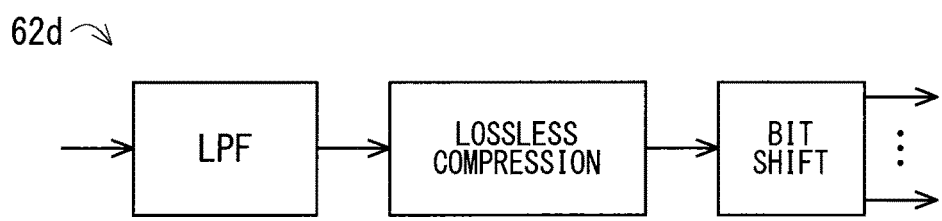
FIG. 12 is a block diagram illustrating a fourth example of the lossy compression processor according to the first preferred embodiment.
Figure 14:
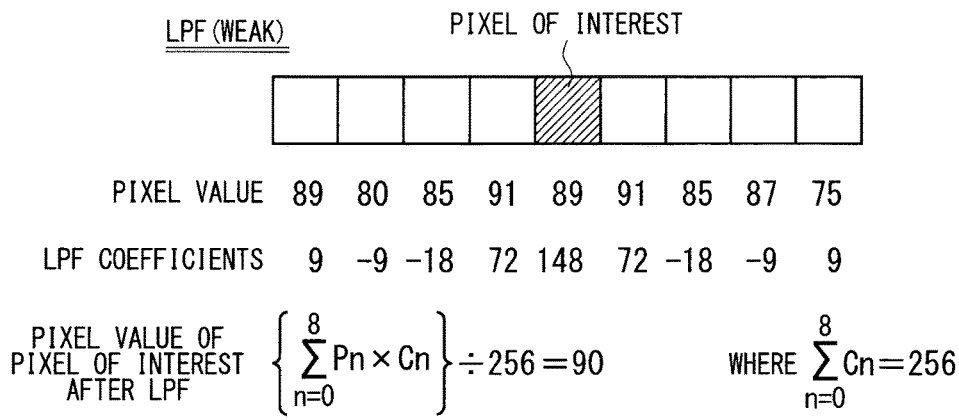
FIG. 14 illustrates an example of computation using a weak LPF according to the first preferred embodiment.
Figure 15:
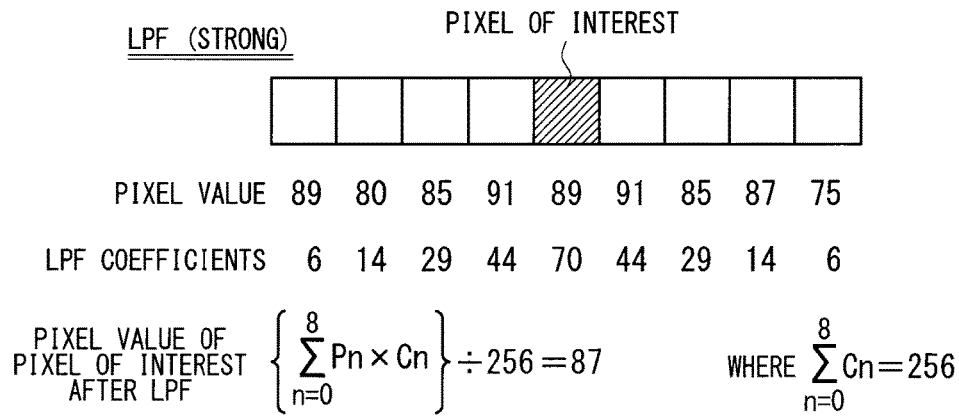
FIG. 15 illustrates an example of computation using a strong LPF according to the first preferred embodiment.

Specifically, the four lossy compression processors 62 include two lossy compression processors 62b1 and 62b2 that are each configured by the lossy compression processor 62b (see FIG. 10), and two lossy compression processors 62d1 and 62d2 that are each configured as the lossy compression processor 62d (see FIG. 12). The lossy compression processors 62b1 and 62d1 share an execution part that performs low-pass processing and lossless compression. A bit shift processing on an output of the lossy compression processor 62b1 generates an output of the lossy compression processor 62d1. Similarly, the lossy compression processors 62b2 and 62d2 share an execution part that performs low-pass processing and lossless compression. The LPF shared by the lossy compression processors 62b1 and 62d1 has a lower strength than the LPF shared by the lossy compression processors 62b2 and 62d2. FIG. 14 illustrates computation using the weak LPF, and FIG. 15 illustrates computation using the strong LPF.

Here, compressed data that is generated by the lossless compression processor 61 is referred to as "Da" as illustrated in FIG. 13.

Also, compressed data that is generated by the lossy compression processor 62b1 having the weak LPF is referred to as "Db." The two pieces of compressed data that are generated by the lossy compression processor 62d1 having the weak LPF are referred to as "Dc" and "Dd." The compressed data Dc is obtained by shifting the compressed data Db by one bit to the right, and the compressed data Dd is obtained by shifting the compressed data Db by two bits to the right.

Also, compressed data that is generated by the lossy compression processor 62b2 having the strong LPF is referred to as "De." The two pieces of compressed data that are generated by the lossy compression processor 62d2 having the strong LPF are referred to as "Df" and "Dg." The compressed data Df is obtained by shifting the compressed data De by one bit to the right, and the compressed data Dg is obtained by shifting the compressed data De by two bits to the right.

The following is a more specific description of the operation performed by the compressor 32 with reference to the example in FIG. 13.

Exemplary Operation of Compressor

In the compressor 32, as described above, the compressed data generator 41 generates a plurality of types of compressed data from a single piece of image data, and the selector 42 selects one of the plurality of types of compressed data. The selection processing performed by the selector 42 uses the data size condition and the data accuracy condition.

First, the data accuracy condition will be described. As described above, the data accuracy condition is that the information maintaining accuracy is highest among compressed data that satisfy the data size condition. It is assumed that a hierarchy of the information maintaining accuracy is predetermined through simulation, testing, or the like, which is performed in advance, and information about the hierarchy is provided in advance to the selector 42.

Figure 16:
FIG. 16 illustrates an example of a hierarchy of information maintaining accuracy according to the first preferred embodiment.

Hereinafter, an example in FIG. 16 will be referenced with regard to the hierarchy of the information maintaining accuracy of the compressed data pieces Da to Dg (see FIG. 13). In the example in FIG. 16, the losslessly compressed data Da has the highest information maintaining accuracy. The information maintaining accuracy decreases in the order of the lossy compressed data pieces Db, De, Dc, Df, and Dd, and the lossy compressed data Dg has the lowest information maintaining accuracy.

Next, the data size condition will be described. As described above, the data size condition is that the data size of compressed data is less than or equal to a predetermined value. More specifically, the data size condition requires all first blocks BL1 included in a second block BL2 used in selection processing to have a data size less than or equal to the predetermined value. A specific example of the data size condition will now be described with reference to examples of numerical values in FIGS. 17 to 19.

In FIG. 17 and subsequent drawings, four numerical values in each first block BL1 indicate data (in other words, pixel values) of the four pixels of the first block BL1. FIGS. 17, 18, and 19 respectively illustrate image data of the Y component, image data of the Cb component, and image data of the Cr component. The examples apply lossless compression using the technique of FIG. 6 to generate the losslessly compressed data Da. Note that the compressed data generator 41 may be configured to process some or all of the first blocks BL1 in the second block BL2 in parallel, or may be configured to generate them in series.

In the compressed data, the pixels of the first blocks BL1 are classified into determination target pixels (pixels on which determination is to be performed) and excluded pixels (pixels to be excluded from the determination). In FIGS. 17 to 19, excluded pixels are shaded with small dots. In FIG. 17, the pixel at the left end of each first block BL1 is set as an excluded pixel, and the other three pixels are set as determination target pixels. In FIGS. 18 and 19, the pixel at the left end of each first block BL1 is set as an excluded pixel, and the other seven pixels are set as determination target pixels. In other words, pixels that are used as only standard pixels in lossless compression are set as excluded pixels.

The data size condition requires the pixel value of each determination target pixel (here, a difference value obtained from the lossless compression) to be represented by a predetermined number of bits or less. The predetermined number of bits is set to a value smaller than the number of bits (in the present example, 8 bits) assigned to represent each pixel value in compression target data (i.e., image data input to the compressor 32).

As one example, the predetermined number of bits for image data of the Y component is assumed to be 5 bits. In this case, the data size condition requires the pixel value of each determination target pixel to fall within a range of numerical values that can be represented by 5 bits (i.e., in the range of −16 to +15). Note that a negative number is represented in two's complement notation. As an example, the predetermined number of bits for image data of the Cb and Cb components is assumed to be 4 bits. In this case, the data size condition requires the pixel value of each determination target pixel to fall within a range of numerical values that can be represented by 4 bits (i.e., in the range of −8 to +7).

The examples in FIGS. 17 to 19 show that the pixel values of the determination target pixels in all of the first blocks BL1 can be represented by the predetermined numbers of bits or less. Consequently, the examples in FIGS. 17 to 19 satisfy the data size condition.

In the examples in FIGS. 17 to 19, the losslessly compressed data Da is generated. As described above, the losslessly compressed data Da has the highest information maintaining accuracy (see FIG. 16). Accordingly, in the examples in FIGS. 17 to 19, the compressed data Da satisfies both the data size condition and the data accuracy condition. Consequently, the compressed data Da is selected by the selector 42 and output from the compressor 32.

The data size of the uncompressed second block BL2 is calculated as follows. The data size of the Y component is 512 bits (={8 bits×4 pixels}×16 blocks), the data size of the Cb component is 128 bits (={8 bits×8 pixels}×2 blocks), and the data size of the Cr component is also 128 bits. Thus, the total number of bits is 768 bits.

On the other hand, the data size of the compressed second block BL2 that satisfies the data size condition is calculated as follows. The data size of the Y component is 368 bits (={8 bits×1 pixel+5 bits×3 pixels}×16 blocks), the data size of the Cb component is 72 bits (={8 bits×1 pixel+4 bits×7 pixels}×2 blocks), and the data size of the Cr component is also 72 bits. Thus, the total number of bits is 512 bits.

That is, when the data size condition is satisfied, the second block BL2 can be compressed from 768 bits to 512 bits.

Next, another example of numerical values will be described with reference to FIGS. 20 to 25. Although only the Y component is illustrated in FIGS. 20 to 25, the same procedure can also be applied to the Cb and Cr components.

In FIG. 20, lossless compression is performed on compression target data (i.e., image data input to the compressor 32) to generate losslessly compressed data Da (see FIG. 13).

In FIG. 21, low-pass processing using a weak LPF and lossless compression are performed in this order on the compression target data to generate lossy compressed data Db (see FIG. 13). Note that the low-pass processing performed on first blocks BL1 at the left and right ends of the second block BL2 uses first blocks BL1 of adjacent second blocks BL2 (see first blocks BL1 indicated by dashed double-dotted lines in FIG. 22), as described with reference to FIG. 9.

FIG. 23 illustrates lossy compressed data Dc that is generated by performing low-pass processing using a weak LPF, lossless compression, and a right bit shift (by one bit) in this order on the compression target data (see FIG. 13). Note that lossy compressed data Dd that is generated through a right 2-bit shift is not shown.

In FIG. 24, low-pass processing using a strong LPF and lossless compression are performed in this order on the compression target data to generate lossy compressed data De (see FIG. 13). FIG. 25 illustrates lossy compressed data Df that is generated by performing low-pass processing using a strong LPF, lossless compression, and a right bit shift (by one bits) in this order on the compression target data (see FIG. 13). Note that lossy compressed data Dg that is generated through a right 2-bit shift is not shown.

In the examples in FIGS. 20 to 25, pixel values enclosed by circles in the compressed data pieces Da, Db, Dc, and De do not fall within the range of numerical values that can be represented by 5 bits (i.e., in the range of −16 to +15). This indicates that the compressed data pieces Da, Db, Dc, and De do not satisfy the data size condition. On the other hand, it can be seen from FIG. 25 that the compressed data Df satisfies the data size condition. In this case, the compressed data Df has the highest information maintaining accuracy among pieces of compressed data that satisfy the data size condition, with reference to FIG. 16. That is, the compressed data Df also satisfies the data accuracy condition. Accordingly, the compressed data Df is selected by the selector 42 and output from the compressor 32.

FIG. 26 illustrates image data that is obtained by reconstructing the compressed data Df. FIG. 27 illustrates errors between the uncompressed image data and the image data obtained by reconstructing the compressed data Df. In the example in FIG. 27, the sum of absolute values of the errors is 40.

Here, it is efficient to perform the data size condition determination in descending hierarchy of the information maintaining accuracy among a plurality of types of compressed data generated by the compressed data generator 41. This is because finding compressed data that satisfies the data size condition will eliminate the need to perform the data size condition determination for the remaining compressed data. In addition, for example in the case where the compressed data generator 41 generates a plurality of types of compressed data in series, finding compressed data that satisfies the data size condition will eliminate the need to generate the remaining compressed data for the second block BL2.

Note that if the predetermined number of bits in the data size condition is M bits, compressed data that satisfies the data size condition can reliably be generated by providing a bit shift processing with a shift amount of {8−M} bits.

Another Example of Lossless Compression

With the lossless compression described with reference to FIG. 6, a left-side pixel, excluding the pixel at the left end, is set as a standard pixel, and a difference in pixel value between the two pixels is calculated. With this technique, a small difference value is readily obtained. Consequently, it is possible to reduce the shift amount in the bit shift processing, in other words, to reduce the number of steps in the bit shift processing.

On the other hand, if the lossy compression processor 62 uses the lossless compression in FIG. 6, errors may accumulate toward the right side of the first block BL1, in other words, errors may diffuse to the right side in the first block BL1.

In contrast, a lossless compression illustrated in FIG. 28 can suppress diffusion of errors. Specifically, the pixel value Pa of the pixel PXa remains unchanged even after compression according to the example in FIG. 28. On the other hand, the pixel value of the pixel PXb is converted to {Pb−Pa}, the pixel value of the pixel PXc is converted to {Pc−Pa}, and the pixel value of the pixel PXd is converted to {Pd−Pa}.

That is, although the example in FIG. 28 illustrates the same content of processing for calculating differences in pixel value as that in FIG. 6, the definitions of the pixel classifications are different. Specifically, the pixel classification which is adopted in the example in FIG. 28 is such that a pixel PX at a predetermined fixed position in the first block BL1 is defined as a standard pixel, and the remaining pixels PX at positions other than the fixed position in the first block BL1 are defined as compression target pixels. While the example in FIG. 28 defines the left end of the first block BL1 as the fixed position, the fixed position may be any other position. Note that similar lossless compression can also be performed on the image data of the Cb and Cr components.

FIGS. 29 to 34 illustrate examples of numerical values in the case of using the lossless compression in FIG. 28. Although only the Y component is illustrated in FIGS. 29 to 34, the same procedure can also be applied to the Cb and Cr components.

In FIG. 29, low-pass processing using a weak LPF and lossless compression in FIG. 28 are performed in this order on compression target data to generate lossy compressed data Db (see FIG. 13). FIG. 30 illustrates lossy compressed data Dc that is generated by performing low-pass processing using a weak LPF, lossless compression in FIG. 28, and a right bit shift (by one bit) in this order on the compression target data (see FIG. 13). FIG. 31 illustrates lossy compressed data Dd that is generated through a right 2-bit shift (see FIG. 13).

In FIG. 32, low-pass processing using a strong LPF and lossless compression in FIG. 28 are performed in this order on the compression target data to generate lossy compressed data De (see FIG. 13). FIG. 33 illustrates lossy compressed data Df that is generated by performing low-pass processing using a strong LPF, lossless compression in FIG. 28, and a right bit shift (by one bit) in this order on the compression target data (see FIG. 13). FIG. 34 illustrates lossy compressed data Dg that is generated through a right 2-bit shift (see FIG. 13).

The examples in FIGS. 29 to 34 show that the compressed data Dg satisfies both the data size condition and the data accuracy condition. Accordingly, the compressed data Dg is selected by the selector 42 and output from the compressor 32.

FIG. 35 illustrates image data that is obtained by reconstructing the compressed data Dg in FIG. 34. FIG. 36 illustrates errors between the uncompressed image data and the image data obtained by reconstructing the compressed data Dg. In the example in FIG. 36, the sum of absolute values of the errors is 60.

Here, the lossless compressor 51 and the lossy compressor 52 are assumed to adopt the same lossless compression, but the present invention is not limited to this example. For example, the lossless compressor 51 may adopt the technique in FIG. 6, and the lossy compressor 52 may adopt the technique in FIG. 28. In the case where the lossy compressor 52 includes a plurality of lossy compression processors 62, some or all of the lossy compression processors 62 may adopt a lossless compression that is different from the technique adopted by the lossless compression processor 61. Using the same lossless compression technique simplifies apparatus design, for example. In addition, it is possible to share the circuit to be used in lossless compression. On the other hand, using different lossless compression techniques makes it possible to adjust the information maintaining accuracy and to thereby increase the degree of freedom of apparatus design.

Another Example of Lossy Compression

Yet another example of the lossy compression processors 62 will be described with reference to FIGS. 37 and 38. A lossy compression processor 62e in FIG. 37 generates compressed data by performing a bit-reduction processing on compression target pixels in compression target data. In the bit-reduction processing, the number of bits in each pixel value is reduced by deleting a predetermined range of bits from the least significant bit (LSB) of the bit string, which represents the pixel value, as illustrated in FIG. 38.

FIG. 38 illustrates an example in which an uncompressed pixel value is represented by "01011001" in binary notation (or "89" in decimal notation), and the least significant three bits are deleted. In other words, the most significant five bits "01011" are extracted as compressed data and output from the lossy compression processor 62e.

Here, extracting the most significant five bits makes it possible for the pixel value of the compression target pixel to reliably fit in the range of numerical values that can be represented by five bits (i.e., in the range of −16 to +15).

FIG. 39 shows an example of numerical values when compressed data generated from the bit-reduction processing is reconstructed. Note that the reconstruction processing is processing for combining "000" as the least significant three bits with the compressed pixel value consisting of five bits. FIG. 40 illustrates errors in image data before and after compression. In the example in FIG. 40, the sum of absolute values of the errors is 236.

In the example in FIG. 39, all pixels in the second block BL2 are set as compression target pixels. This can simplify apparatus design, for example. Alternatively, only three pixels on the right side of each first block BL1 may be set as compression target pixels. In either case, compression target pixels are set as determination target pixels used in the selector 42.

Note that the same bit-reduction processing is also applicable to the Cb and Cr components. Alternatively, the lossy compression processor 62e that performs bit-reduction processing may be combined with other lossy compression processors. As another alternative, another lossy compression processor 62 may be configured by combining bit-reduction processing with various types of processing (see FIGS. 10 to 13, for example).

Advantageous Effects

The data storage control apparatus 9 compresses reference image data before storing it in the DRAM 10. It is thus possible to reduce the use amount of memory capacity of the DRAM 10.

In addition, the data size of compressed data for each second block BL2, which is output from the compressor 32, is the same irrespective of the type of compression technique that is used by the compressor 32. In other words, compressed data output from the compressor 32 has a fixed length.

If the data size differs for each block, addresses of storage areas need to be managed on the basis of different data sizes to compactly store the data of each block in the DRAM. If the storage area is divided into equal areas to match the maximum data size to simplify address management, the use amount of memory capacity of the DRAM cannot be reduced.

In contrast, the data storage control apparatus 9 causes the compressor 32 to output compressed data of the same size as described above. It is thus possible with simple address management to compactly store compressed data. Compact storage of compressed data contributes to a reduction in the use amount of memory capacity of the DRAM 10. For example, since the data size of each second block BL2 can be reduced to two-third (=512 bits/768 bits) as described above, it is possible to reduce the use amount of memory capacity of the DRAM 10 to two-third.

Data Readout Control Apparatus

Figure 41:
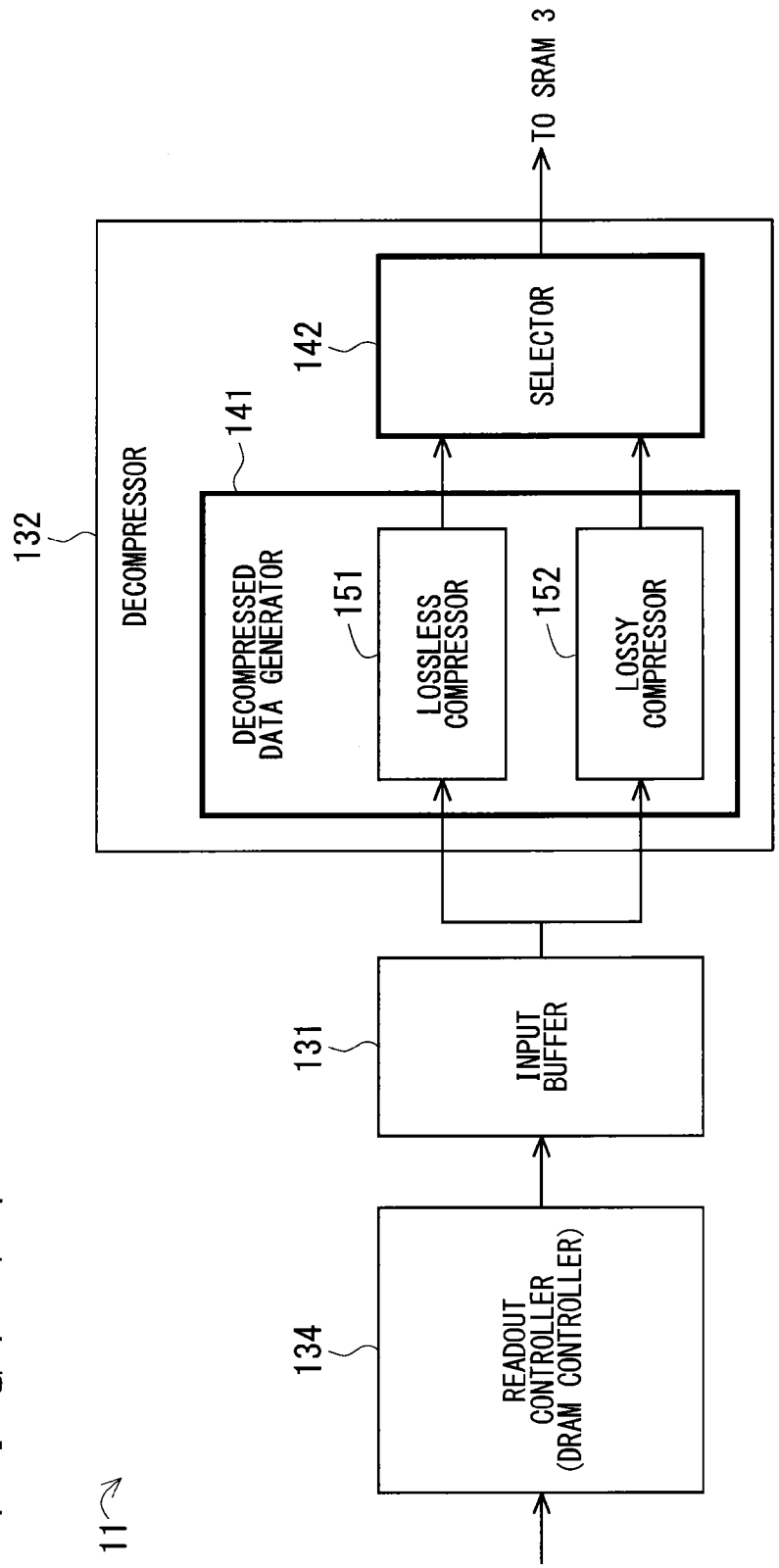
FIG. 41 is a block diagram illustrating a data readout control apparatus according to the first preferred embodiment.

FIG. 41 is a block diagram illustrating the data readout control apparatus 11. In the example in FIG. 41, the data readout control apparatus 11 includes a readout controller 134, an input buffer 131, and a decompressor 132.

The readout controller 134 reads out compressed data stored in the storage unit 10 (see FIG. 1) and transfers the compressed data to the input buffer 131. In the case where the storage unit 10 is a DRAM, the readout controller 134 can be configured as a so-called DRAM controller. In the following description, the readout controller 134 is thus also referred to as the "DRAM controller 134."

The input buffer 131 is configured of an SRAM, for example. The input buffer 131 temporarily stores compressed data to be supplied to the decompressor 132.

The decompressor 132 decompresses compressed data acquired via the input buffer 131. The decompressor 132 includes a decompressed data generator 141 and a selector 142. The decompressed data generator 141 includes a lossless compressor 151 and a lossy compressor 152. The lossless compressor 151 and the lossy compressor 152 respectively have the same configurations as the lossless compressor 51 and the lossy compressor 52 of the data storage control apparatus 9 (see FIG. 2). The selector 142 has the same configuration as the selector 42 of the data storage control apparatus 9.

Accordingly, the decompressed data generator 141 generates a plurality of types of data from the compressed data read out from the DRAM 10. The selector 142 selects one piece of data that satisfies a predetermined selection condition (i.e., a selection condition adopted by the selector 42) from among the plurality of types of data. The data selected by the selector 142 is then transferred as decompressed data to the SRAM 3.

Here, the reference image data (in the example in FIG. 1, deblocked reference image data) generated within the encoding apparatus 1 is compressed by the data storage control apparatus 9, then reconstructed by the data readout control apparatus 11, and then supplied to the motion predictor 4. In this case, to predict motion favorably, an image that is the same as, or as close as possible to, the uncompressed reference image (in other words, an image whose error relative to the uncompressed reference image is within a tolerance) is preferably supplied to the motion predictor 4. Note that the tolerance is, for example, preset through simulation, testing or the like, which is performed in advance.

For example, assume the case in which the compressed data generator 41 and the decompressed data generator 141 adopt the configuration in FIG. 13. In this case, to the compressed data pieces Dc, Dd, Df, and Dg that have undergone a bit shift processing can provide a reference image that is within a tolerance by the decompression using the same technique as that used in compression. On the other hand, the compressed data pieces Da, Db, and De that do not undergo the bit shift processing can provide a reference image within a tolerance by any decompression technique.

In light of this, with regard to the compressed data pieces Dc, Dd, Df, and Dg that have undergone the bit shift processing, it is preferable for the selector 142 of the decompressor 132 to be instructed as to which decompressed data to select.

The selection instruction may be provided by the selector 42 of the compressor 32 generating additional information about the compressed data that has been selected and storing the additional information associated with the compressed data in the DRAM 10. The additional information stored in the DRAM 10 is read out along with the compressed data by the data readout control apparatus 11 and supplied to the selector 142. This enables the selector 142 to operate in accordance with the selection instruction included in the additional information.

The additional information may be configured as a 3-bit flag, for example. More specifically, one bit of the three-bit flag indicates the presence or absence of a selection instruction to be given to the selector 142 of the decompressor 132. The remaining two bits serve as an identifier that indicates which one of the compressed data pieces Dc, Dd, Df, and Dg corresponds to compressed data, i.e., a specific instruction that indicates which decompressed data to select. Note that the number of bits allocated for the identifier may be determined according to the number of compressed data pieces used for identification.

Note that the configuration of the additional information is not limited to the above example. In the DRAM 10, the area for storing the additional information may be continuous to the area for storing the corresponding compressed data, or it may be separated from the area for storing the corresponding compressed data. For example, the DRAM 10 may have an area for storing only the additional information.

In the present example, each second block BL2 is compressed to a fixed length (e.g., 512 bits) as described above. The additional information is generated for each second block BL2 and has a data size of only 3 bits or so in the above-described example. Thus, the data storage control apparatus 9 that adopts the additional information can achieve the same effects as described above.

Second Preferred Embodiment

A second preferred embodiment describes data transfer control in the data storage control apparatus 9.

Figure 9:
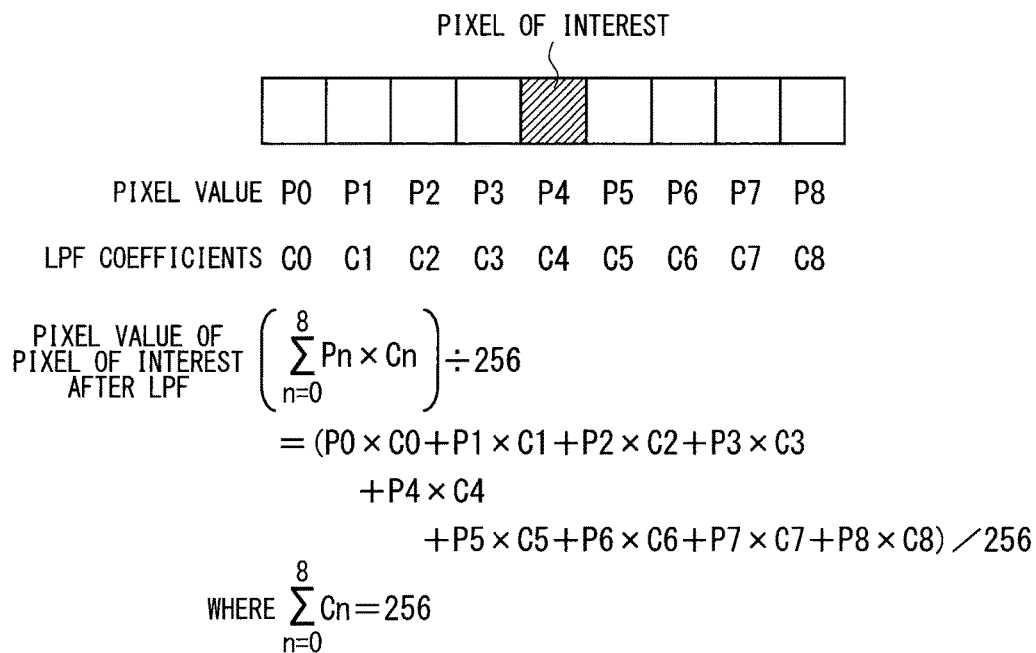
FIG. 9 illustrates the first example of the lossy compression processor according to the first preferred embodiment.

As described in the first preferred embodiment, low-pass processing used in lossy compression involves referencing pixel values of first blocks BL1 that are adjacent to a first block BL1 to be compressed (see FIGS. 9 and 22). In other words, the low-pass processing is one example of reference-type processing that uses, as reference object, first block BL1 that is not set to a compression object.

In this case, the input buffer 31 needs to store not only image data of the first blocks BL1 that are scheduled to be used as compression objects but also image data of first blocks BL1 that are scheduled to be used as reference objects.

On the other hand, the input buffer 31 can delete image data of a first block BL1 that is no longer scheduled to be used as either a compression object or a reference object. In other words, the input buffer 31 frees a storage area occupied by image data of a first block BL1 that is no longer scheduled to be used as either a compression object or a reference object, at a predetermined timing after usage (in other words, the storage area can now be overwritten).

This will be described with reference to FIGS. 42 to 45. Note that the following describes image data of the Y component, but the same procedure also applies to the Cb and Cr components.

Figure 42:
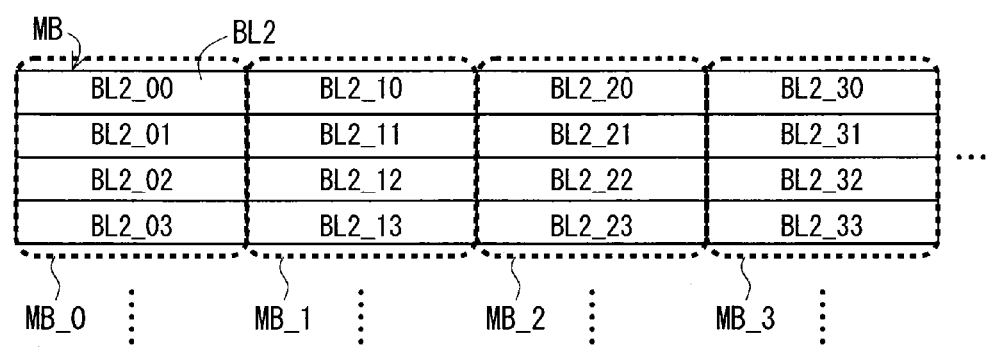
FIG. 42 illustrates a data configuration according to a second preferred embodiment.
Figure 43:
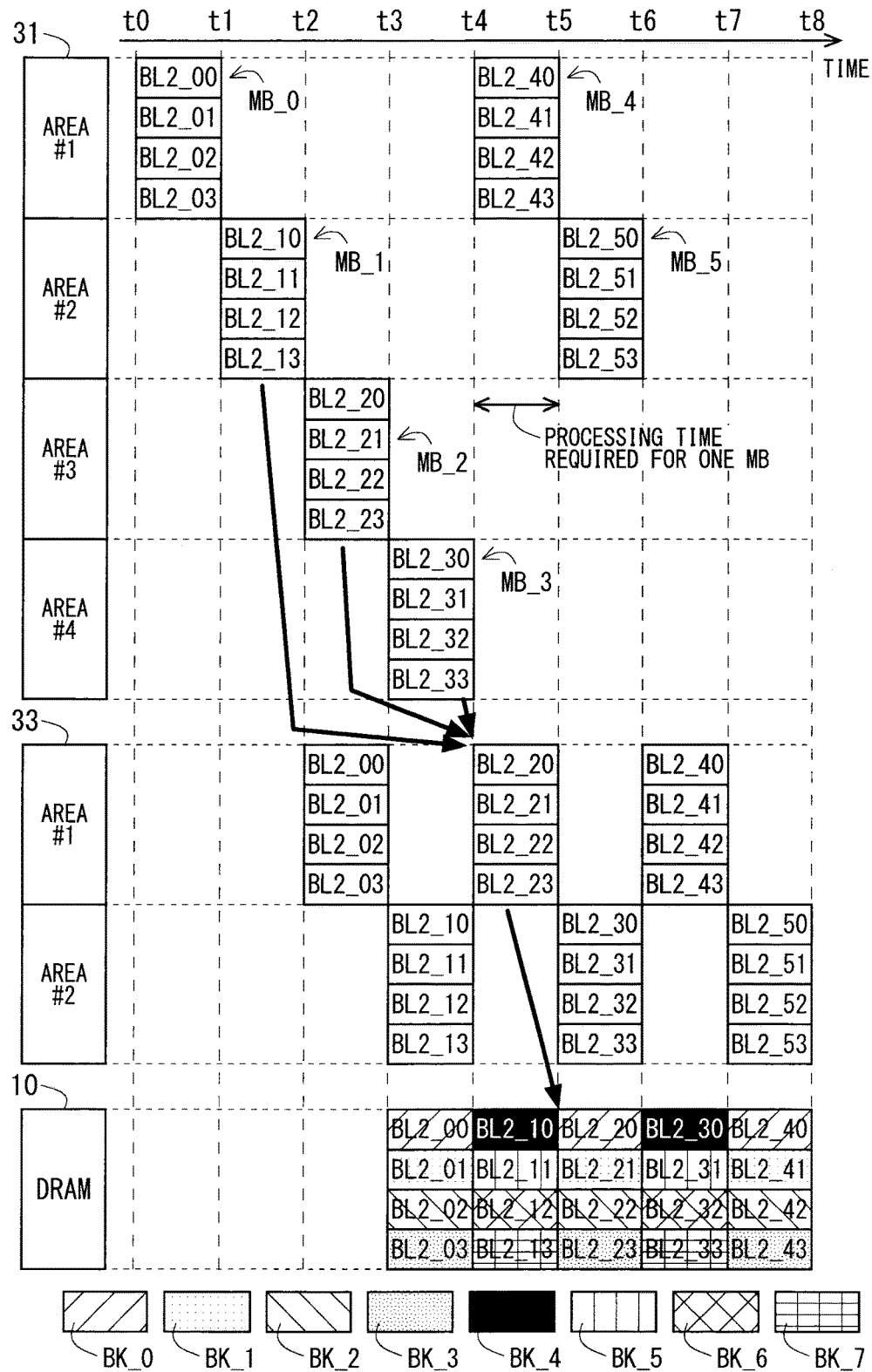
FIG. 43 illustrates a first example of data transfer control according to the second preferred embodiment.

Here, an example is given in which the pixel data of the Y component is supplied to the input buffer 31 in units of macroblocks MB each including 16×16 pixels, and in raster scan order, as illustrated in FIGS. 42 and 43. Note that each macroblock MB is identified by a suffix number added to the reference character "MB" as illustrated in FIG. 42. A suffix number is also added to other reference characters.

Assume that the compressor 32 acquires image data in units of third blocks, each including X (X is an integer of 1 or more) second blocks BL2, from the input buffer 31. In the example in FIG. 43, a third block is assumed to be a macroblock MB (i.e., X=4).

In the example in FIG. 43, the input buffer 31 has four storage areas #1 to #4. Note that the four storage areas #1 to #4 may be different SRAMs, in which case the four SRAMs are collectively referred to as the "input buffer 31."

In the example in FIG. 43, when low-pass processing is performed on a first block BL1 included in a macroblock MB_2, macroblocks MB_1 and MB_3 that are adjacent to the macroblock MB_2 on either side are used as reference objects. Thus, the input buffer 31 needs to store data of the macroblocks MB_1, MB_2, and MB_3.

At this time, a macroblock MB_0 is no longer being used as either a compression object or a reference object. Thus, the storage area #1 in which the macroblock MB_0 is stored is freed from time t2 onwards, the time t2 being a time at which the macroblock MB_2 is set to a compression object. In the example in FIG. 43, image data of a macroblock MB_4 is stored at a later time t4 in the storage area #1.

In this case, the input buffer memory 31 manages the storage areas #1 to #4 in association with the macroblock MB serving as the aforementioned third block.

Managing data in the input buffer 31 in this way allows efficient use of the input buffer 31. In addition, such cyclic use of the storage areas of the input buffer 31 allows the input buffer 31 to have small capacity.

Here, the DRAM 10 has a plurality of (in the present example, eight) banks BK. Thus, the DRAM controller 34 writes write data to the DRAM 10 while switching the banks BK every piece of write data. In the example in FIG. 43, the banks BK are switched every second block BL2.

In the example in FIG. 44, image data is supplied in units of second blocks BL2 and in raster scan order to the input buffer 31. The compressor 32 acquires image data from the input buffer 31 in units of third blocks, each including X (X is an integer of 1 or more) second blocks BL2. In the example in FIG. 44, a third block is assumed to be one second block BL2 (i.e., X=1).

In the example in FIG. 44, when low-pass processing is performed on a first block BL1 included in a second block BL2_20, second blocks BL2_10 and BL2_30 that are adjacent to the second block BL2_20 on either side are used as reference objects. Thus, the input buffer 31 needs to store image data of the second blocks BL2_10, BL2_20, and BL2_30.

At this time, a second block BL2_00 is no longer being used as either a compression object or a reference object. Thus, the storage area #1 in which the second block BL2_00 is stored is freed from time t2 onwards, the time t2 being a time at which the second block BL2_20 is set to a compression object. In the example in FIG. 44, image data of a second block BL2_40 is stored in the storage area #1 at a later time t4.

In this case as well, the input buffer memory 31 manages the storage areas #1 to #4 in association with the second blocks BL2 serving as the aforementioned third blocks.

In the example in FIG. 44, also the DRAM controller 34 writes write data to the DRAM 10 while switching the banks BK every piece of write data.

Here, in the example in FIG. 44, the DRAM controller 34 writes write data to the DRAM 10, one bank's worth of write data at a time (i.e., one second block BL2 at a time). Alternatively, the DRAM controller 34 may wait for Y banks' worth of write data (Y is an integer of two or more; in the example in FIG. 45, Y=4) to be accumulated in the output buffer 33, and may collectively write these Y pieces of write data to the DRAM 10.

Upstream of the input buffer 31 (e.g., the deblocking filter 8), image processing is performed in units of macroblocks MB as described above. In the examples in FIGS. 42 to 45, a single macroblock MB corresponds to four second blocks BL2. In the example in FIG. 43, data is input to the input buffer 31 in units of four second blocks BL2, whereas in the examples in FIGS. 44 and 45, data is input in units of one second block BL2. Meanwhile, in the examples in FIGS. 43 and 45, data is written to the DRAM 10 in units of four second blocks BL2, whereas in the example in FIG. 44, data is written in units of one second block BL2.

In light of the above, setting the second blocks BL2 such that a single macroblock MB is configured by a plurality of second blocks BL2 prevents generation of blocks smaller than the second blocks BL2 (hereinafter, referred to as "small blocks").

This facilitates management of the storage areas of the input buffer 31 at the time of inputting and outputting data to and from the input buffer 31. Such facilitated storage management enables efficient use of the input buffer 31.

Absence of small blocks at the time of transferring data to the DRAM 10 is helpful in efficiently generating transfer data. Further, it is possible to avoid an increase in bus band that may be caused by the need of transferring small blocks. In other words, it is possible to reduce the bus band. The absence of small blocks also makes it easy for the DRAM controller 34 to manage addresses of the DRAM 10 (in other words, to manage access to the DRAM 10).

Moreover, setting the second blocks BL2 such that a single macroblock MB is configured by a plurality of second blocks BL2 is advantageous in facilitating the introduction of the data storage control apparatus 9 in various encoding apparatuses that perform image processing in units of macroblocks MB.

Here, the above-described effects can also be achieved when a single macroblock MB is configured by one second block BL2. The same also applies to the case where a plurality of macroblocks MB correspond to a single second block BL2. The effects described above can also be achieved when a plurality of macroblocks MB correspond to a plurality of second blocks BL2, i.e., when a plurality of macroblocks MB are regarded as a single block, and this single block is divided into a plurality of second blocks BL2 without producing small blocks mentioned above.

In summary, the above-described effects can be achieved by setting second blocks BL2 such that V (V is an integer of 1 or more) second blocks BL2 correspond to W (W is an integer of 1 or more) macroblocks MB.

Note that the second preferred embodiment is also applicable to the case where the compressor 32 adopts a compression technique different from that in the first preferred embodiment. The compression technique may be a moving image compression technique or a still image compression technique (e.g., using the Joint Photographic Expert Group (JPEG) format).

The reference-type processing may be other than low-pass processing. Also, the lossless compression may include reference-type processing.

Variations

The first and second preferred embodiments assume the case in which various types of processing performed by the data storage control apparatus 9 and the encoding apparatus 1 are all implemented by hardware. In contrast, some or all of the various types of processing may be implemented by software (in other words, by a microprocessor executing a program).

While the invention has been shown and described in detail, the foregoing description is in all aspects illustrative and not restrictive. It is therefore understood that numerous modifications and variations can be devised without departing from the scope of the invention.

What is claimed is:

1. A data storage control apparatus comprising:
   compressor circuitry configured to compress image data and outputs compressed data; and
   writing controller circuitry configured to write said compressed data as write data to a memory, wherein
   said compressor circuitry includes:
      compressed data generator circuitry that includes lossless compressor circuitry configured to perform lossless compression and lossy compressor circuitry configured to perform lossy compression, and that is configured to compress, by using said lossless compressor circuitry and said lossy compressor circuitry, said image data in units of first blocks, each being an image block of a predetermined area size, to generate a plurality of types of compressed data in parallel or in series such that the plurality of types of compressed data are generated from each of a single first block; and
      selector circuitry configured to perform selection processing on each second block that includes a predetermined number N of said first blocks, where N is an integer of 1 or more, said selection processing involving determining whether each of said plurality of types of compressed data generated by said compressed data generator circuitry satisfies a predetermined selection condition and selecting one piece of compressed data that satisfies said predetermined selection condition,
   said predetermined selection condition includes:
      a data size condition that a data size of all of said first blocks included in said second block is less than or equal to a predetermined value; and
      a data accuracy condition that information maintaining accuracy is highest among said compressed data that satisfies said data size condition,
   said writing controller circuitry is configured to write said one piece of compressed data selected by said selector circuitry as said write data to said memory,
   said lossless compression is processing for obtaining a difference in pixel value between a compression target pixel and a standard pixel and assigning a resultant difference value to said compression target pixel,
   said lossless compressor circuitry is configured to define said compression target pixel and said standard pixel in said first block in accordance with a predetermined pixel classification and perform said lossless compression on said compression target pixel and said standard pixel that have been defined,
   said lossy compressor circuitry includes at least one of:
      first lossy compression processor circuitry configured to generate first compressed data by performing first low-pass processing using a first low-pass filter on compression target data;
      second lossy compression processor circuitry configured to generate second compressed data by performing said first low-pass processing and said lossless compression in this order on said compression target data; and
      third lossy compression processor circuitry configured to generate at least one piece of third compressed data by performing said first low-pass processing and said lossless compression in this order on said compression target data and performing a first bit shift processing in which a bit of said difference value obtained from said lossless compression is shifted toward the least significant bit.

2. The data storage control apparatus according to claim 1, wherein
   said predetermined pixel classification includes a first pixel classification according to which pairs of pixels are sequentially selected in said first block, each of pairs including pixels adjacent to each other in said first block that are defined with one pixel as said compression target pixel and the other pixel as said standard pixel.

3. The data storage control apparatus according to claim 1, wherein
   said predetermined pixel classification includes a second pixel classification according to which a pixel at a predetermined fixed position in said first block is defined as said standard pixel, and each pixel at a position other than said fixed position in said first block is defined as said compression target pixel.

4. The data storage control apparatus according to claim 1, wherein
   said at least one piece of third compressed data is a plurality of pieces of third compressed data that are generated by using different shift amounts in said first bit shift processing.

5. The data storage control apparatus according to claim 1, wherein
   said lossy compressor circuitry further includes at least one of:
      fourth lossy compression processor circuitry configured to generate fourth compressed data by performing second low-pass processing using a second low-pass filter on said compression target data, said second low-pass filter having a different strength from said first low-pass filter;
      fifth lossy compression processor circuitry configured to generate fifth compressed data by sequentially performing said second low-pass processing and said lossless compression on said compression target data; and
      sixth lossy compression processor circuitry configured to generate at least one piece of sixth compressed data by performing said second low-pass processing and said lossless compression in this order on said compression target data, and performing a second bit shift processing in which a bit of said difference value obtained from said lossless compression is shifted toward the least significant bit.

6. The data storage control apparatus according to claim 5, wherein
   said at least one piece of sixth compressed data is a plurality of pieces of sixth compressed data that are generated by using different shift amounts in said second bit shift processing.

7. The data storage control apparatus according to claim 1, wherein
said lossless compressor circuitry and said lossy compressor circuitry operate in parallel.

8. The data storage control apparatus according to claim 1, further comprising:
an input buffer memory that temporarily stores said image data that is to be supplied to said compressor,
wherein said lossless compression or said lossy compression includes reference-type processing that uses, as a reference object, a first block that is not set to a compression object among said first blocks, and
said input buffer memory stores said image data of a first block that is scheduled to be used as either said compression object or said reference object, and frees a storage area allocated to a first block that is no longer scheduled to be used as either said compression object or said reference object, at a predetermined timing.

9. The data storage control apparatus according to claim 8, wherein
said compressor acquires said image data in units of third blocks, each including a predetermined number X of said second blocks, where X is an integer of 1 or more, from said input buffer memory, and
said input buffer memory manages said storage area in association with said third blocks.

10. The data storage control apparatus according to claim 8, further comprising:
an output buffer memory that temporarily stores said write data that is output from said compressor for the supply to said writing controller,
wherein said memory includes a plurality of banks, and
said writing controller writes said write data to said memory while switching said plurality of banks every piece of said write data.

11. The data storage control apparatus according to claim 10, wherein
said writing controller waits for Y banks' worth of said write data to be accumulated in said output buffer memory, where Y is an integer of 2 or more, and collectively writes said Y banks' worth of said write data to said memory.

12. The data storage control apparatus according to claim 8, wherein
upstream of said input buffer memory, image processing is performed in units of microblocks, and
a predetermined number V of said second blocks corresponds to a predetermined number W of said microblocks, where V and W are integers of 1 or more.

13. A data storage control apparatus comprising:
compressor circuitry configured to compress image data and outputs compressed data; and
writing controller circuitry configured to write said compressed data as write data to a memory, wherein
said compressor circuitry includes:
compressed data generator circuitry that includes lossless compressor circuitry configured to perform lossless compression and lossy compressor circuitry configured to perform lossy compression, and that is configured to compress, by using said lossless compressor circuitry and said lossy compressor circuitry, said image data in units of first blocks, each being an image block of a predetermined area size, to generate a plurality of types of compressed data in parallel or in series such that the plurality of types of compressed data are generated from each of a single first block; and
selector circuitry configured to perform selection processing on each second block that includes a predetermined number N of said first blocks, where N is an integer of 1 or more, said selection processing involving determining whether each of said plurality of types of compressed data generated by said compressed data generator circuitry satisfies a predetermined selection condition and selecting one piece of compressed data that satisfies said predetermined selection condition,
said predetermined selection condition includes:
a data size condition that a data size of all of said first blocks included in said second block is less than or equal to a predetermined value; and
a data accuracy condition that information maintaining accuracy is highest among said compressed data that satisfies said data size condition,
said writing controller circuitry is configured to write said one piece of compressed data selected by said selector circuitry as said write data to said memory,
said lossy compressor circuitry includes first lossy compression processor circuitry configured to generate first compressed data by performing bit-reduction processing on a compression target pixel in compression target data,
said bit-reduction processing involves deleting a predetermined range of bits from the least significant bit side of a bit string that represents said pixel value to reduce the number of bits of said pixel value, and
said predetermined range is set such that said first compressed data always satisfies said data size condition.

14. The data storage control apparatus according to claim 13, further comprising:
an input buffer memory that temporarily stores said image data that is to be supplied to said compressor,
wherein said lossless compression or said lossy compression includes reference-type processing that uses, as a reference object, a first block that is not set to a compression object among said first blocks, and
said input buffer memory stores said image data of a first block that is scheduled to be used as either said compression object or said reference object, and frees a storage area allocated to a first block that is no longer scheduled to be used as either said compression object or said reference object, at a predetermined timing.

15. The data storage control apparatus according to claim 14, wherein
said compressor acquires said image data in units of third blocks, each including a predetermined number X of said second blocks, where X is an integer of 1 or more, from said input buffer memory, and
said input buffer memory manages said storage area in association with said third blocks.

16. The data storage control apparatus according to claim 14, further comprising:
an output buffer memory that temporarily stores said write data that is output from said compressor for the supply to said writing controller,
wherein said memory includes a plurality of banks, and
said writing controller writes said write data to said memory while switching said plurality of banks every piece of said write data.

17. The data storage control apparatus according to claim 16, wherein said writing controller waits for Y banks' worth of said write data to be accumulated in said output buffer memory, where Y is an integer of 2 or more, and collectively writes said Y banks' worth of said write data to said memory.

18. The data storage control apparatus according to claim 14, wherein
upstream of said input buffer memory, image processing is performed in units of microblocks, and
a predetermined number V of said second blocks corresponds to a predetermined number W of said microblocks, where V and W are integers of 1 or more.

* * * * *